(12) United States Patent
Dierickx

(10) Patent No.: US 8,723,344 B1
(45) Date of Patent: May 13, 2014

(54) ENERGY HARVESTING SYSTEM

(76) Inventor: James Dierickx, Lowden, IA (US)

( * ) Notice: Subject to any disclaimer, the term of this patent is extended or adjusted under 35 U.S.C. 154(b) by 210 days.

(21) Appl. No.: 13/168,517

(22) Filed: Jun. 24, 2011

Related U.S. Application Data

(60) Provisional application No. 61/398,375, filed on Jun. 24, 2010.

(51) Int. Cl.
*F02B 63/04* (2006.01)
*F03G 7/08* (2006.01)
*H02K 7/18* (2006.01)

(52) U.S. Cl.
USPC ........................................................ 290/1 R

(58) Field of Classification Search
USPC ........................................................ 290/1 R
See application file for complete search history.

(56) References Cited

U.S. PATENT DOCUMENTS 8,206,263 B2 * 6/2012 Tsuchikawa ................. 477/71

* cited by examiner

*Primary Examiner* — Javaid Nasri
(74) *Attorney, Agent, or Firm* — Faegre Baker Daniels LLP

(57) ABSTRACT

An energy harvesting and harnessing system is mobile and can store energy when the system is not in motion for later use in powering the mobile transport refrigeration unit (TRU) or truck mounted refrigeration units eliminating unnecessary use of the diesel motor on the refrigeration unit. There may be an interface plug between a power generation unit and the cab to power the climate controls and creature comforts in the cab of the truck while parked, thus eliminating unnecessary idling.

20 Claims, 18 Drawing Sheets

US 8,723,344 B1

ENERGY HARVESTING SYSTEM

RELATED APPLICATION

This application claims the benefit of U.S. Provisional Application Ser. No. 61/398,375 filed Jun. 24, 2010 entitled "Kinetic energy harvesting and power conditioning systems for mobile power generation with auxiliary power and refrigeration equipment, also trailer, RV, buses, railroad cars", said application being incorporated by reference herein in its entirety.

TECHNICAL FIELD

The invention pertains generally to energy harvesting systems and more particularly to energy harvesting systems that are adapted to harvest mechanical energy from a moving vehicle and provide electrical power therefrom.

BACKGROUND

A large number of moving vehicles have onboard power needs. An example of an onboard power need is a reefer unit on a refrigerated trailer. In many cases, the reefer unit is powered by a diesel engine within the reefer unit. A need remains for a way to more economically meet onboard power needs such as this.

SUMMARY

The invention is directed to a kinetic energy harvesting system that can be used to capture mechanical energy that results from a moving vehicle and convert the mechanical energy into electrical energy that can be used to power various systems aboard the moving vehicle.

In an embodiment, the invention pertains to a kinetic energy harvesting system for use with a moving vehicle. The system includes a tire configured for rolling contact with a road, a follower wheel assembly that is configured to releasably engage with the tire in rolling contact with the tire to capture rotational motion of the tire, and a direct current generator that is mechanically coupled to the follower wheel assembly such that the rotational motion of the tire is used to generate direct current power. A power storage device is electrically coupled to the direct current generator to store direct current power generated by the direct current generator. An inverter is electrically coupled to the power storage device such that the inverter receives direct current from the power storage device and outputs alternating current. An alternating current motor can be electrically coupled to the inverter such that the alternating current motor receives alternating current from the inverter and an alternating current generator is mechanically coupled to the alternating current motor to drive the alternating current generator such that the alternating current generator generates alternating current that can be used for onboard power needs of the vehicle.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
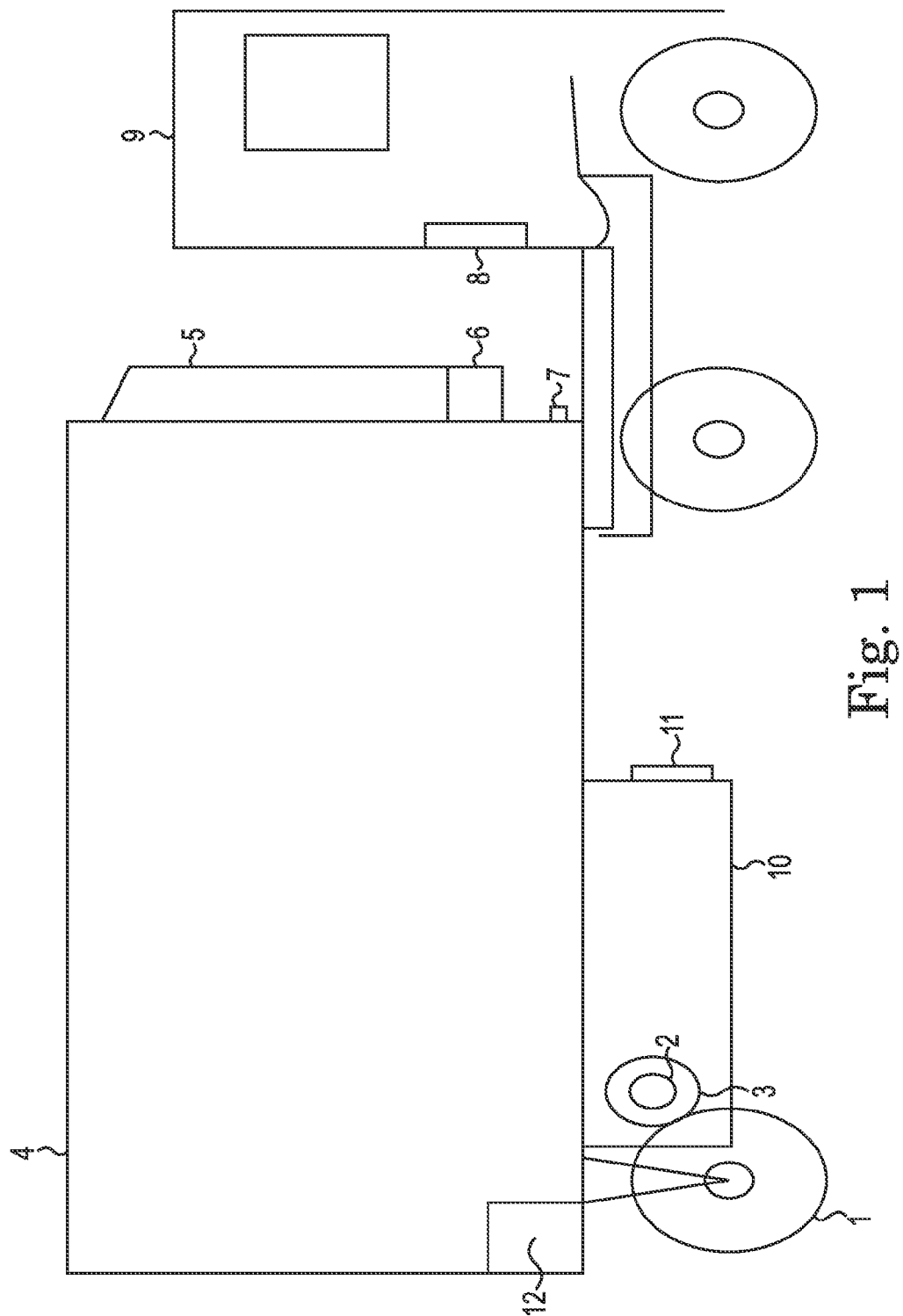
FIG. 1 is a schematic illustration of a system in accordance with embodiments of the invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In some embodiments, the present invention provides an energy harvesting and harnessing system that is mobile and can store energy when the system is not in motion for later use in powering the mobile transport refrigeration unit (TRU) or truck mounted refrigeration units eliminating unnecessary use of the diesel motor on the refrigeration unit. In some embodiments, there may be an interface plug between a power generation unit and the cab to power the climate controls and creature comforts in the cab of the truck while parked, thus eliminating unnecessary idling.

In some embodiments, the present invention includes a follower wheel drive-shaft assembly that mates up with a wheel, or plurality of wheels, in a truck or tractor trailer vehicle system. The follower assembly contacts an outer surface of one or more wheels and thus is driven into rotation that is subsequently converted into electrical energy. In some embodiments, the follower wheel rotates in a direction that is opposite to that of the vehicle wheels. The follower wheel travels counter-clockwise when the vehicle is in forward motion and this allows the convection of the cooling fans to work properly as to not overheat the alternators.

In some embodiments, the follower wheel assembly is mounted outside of the enclosure. The follower wheel assembly is attached to two or more bearing holders that permit a follower shaft to rotate. A spring force may be used to apply a constant force against the follower wheel to keep the follower wheel in contact with the vehicle's wheel/tire assembly. In some embodiments, the bearing holders may be connected to springs that compress and expand as needed to track and keep the follower wheel assembly in constant contact with the vehicle's wheel system. The springs permit the follower wheel to give a little if rocks, ice or other road hazards are picked up and thrown into contact between the follower wheel and an outermost surface of the vehicle's wheel.

In some embodiments, the follower wheel is mechanically connected through one or more of pulleys, sprockets and gears to alternators that convert rotational movement of the follower shaft into DC (direct current) power that can be stored in batteries. In some embodiments, it is possible to use commercially available alternators that have built in voltage regulators that provide power at an appropriate voltage that will not harm the batteries. In some embodiments, standard 12 volt batteries are used, so the voltage regulators limit the alternators to a maximum of 14.3 volts when fully excited.

In some embodiments, the follower wheel assembly may be connected to an electrical or mechanical actuator that is configured to disengage the follower wheel assembly from the vehicle wheel in the event that vehicle tire exceeds desired temperature parameters. In some embodiments, an infrared temperature sensor may be mounted on the outside of the enclosure and may be aimed at the follower wheel and/or at the vehicle wheel that is engaged by the follower wheel in order to ensure that the vehicle tire does not get too hot.

In some embodiments, trucks and trailers are configured to be able to slide their wheel bases by moving the wheels closer together or farther apart in order to accommodate particular weight limits. In some embodiments, the enclosure is able to slide relative to the changing wheel base so that the follower wheel assembly is able to make appropriate contact with the vehicle wheels. In some embodiments, a frame and track are mounted to the underside of the truck or trailer. The track may be mechanically affixed to the under frame of the truck or trailer, and rollers are attached to the enclosure via one or more brackets. The rollers are aligned with the track and are configured to travel back and forth on the track. The enclosure may include a metal bar that is affixed at one end to the enclosure and the other end to the axle of the truck or vehicle unit so that it can slide.

In some embodiments, then, the track system is the only portion of the system that is permanently affixed to the vehicle. As a result, if there are issues associated with non-payment after sale to a customer, the invention would be considered a mobile removal system that would slide right off and could be removed from the vehicle system in the event of repossession, if that were to occur.

In some embodiments, the present invention includes an enclosure that encloses and protects the components of the invention. Some wiring, such as wires going to a refrigeration unit, or wires going to the vehicle cab, are outside of the enclosure. Otherwise, all of the electronics and many of the mechanical systems are enclosed to protect them from being exposed to road hazards such as dust, rocks, sand and corrosive road salts. The enclosure also protects components from other environmental hazards such as mist, dew, snow, and rain that would be detrimental to the operation of this invention.

In some embodiments, the enclosure may be lined on the inside with a non electrical conducting energy absorbing foam material such as EPS (expanded polystyrene). Lining the enclosure helps to isolate the electrical system of the invention from ground shorting and back feeding of power through the vehicle or shore powered electrical systems. The foam lining helps to keep electrical components as vibration free as possible. The foam lining also helps in regulating a climate inside the enclosure within a desirable temperature range and also acts as a moisture barrier.

In some embodiments, there is a 12V light attached to a switch that is electrically attached to the exciter wire to turn on the inductor magnetic field in the alternator and control the voltage output through the limiting voltage flow from the 12V batteries in communication in line with the 12V light bulb that is between the batteries and the exciter wire in on the alternator.

In some embodiments, a speed sensor monitors the follower shaft rotation speed and turns on the switch to the exciter wire with the 12V light circuit only after certain shaft speeds have been obtained. Otherwise, the exciter circuit may drain the batteries of power after long period of time.

In some embodiments, a dynamo generator is attached to the follower shaft that will provide voltage to an electrical switch when the shaft is in rotation that will wake up the passive electronics on the exciter switch that will shut off the exciter circuit with 12V light-bulb when there is no speed detected for 30-60 seconds this will be determined by voltage produced by dynamo connected to the follower shaft. If there is no voltage it will shut off the exciter circuit until there is an input voltage produced by the rotation of the follower shaft then it will turn the exciter circuit back on, thus keeping the batteries attached to the 12 V light bulb exciter circuit from consuming unneeded power when invention is not in use.

In some embodiments, a commercially available air conditioning unit running on either 110V (AC) or 220V (AC) may be attached to the front of the enclosure and may be powered by either one L1 leg and a neutral tap if wired for 110 V (AC), or the L1+L2 inputs to create two pole 220 V (AC). In some embodiments, power may be obtained from shore power if the system is dockside and has access to power through the modified sine inverters in the invention to either power the air conditioning unit from this inverted power. In some embodiments, power may be obtained through the power generating STC or AIG generating head that takes the inverted power that is modified sine wave power and conditions it and changes the modified sine wave from to pure sine and also can changes the cycle frequency of the inverter power.

In some embodiments, the air conditioning operates as needed to prevent the system from overheating. A relay with strategically placed thermostat sensors will turn on the Air Conditioner when needed so if the ambient temperature were, for example, 90 degrees Fahrenheit, this would trigger the starting of the air conditioner start but if the system is idle and not harvesting power for the alternators, or inverting power of generating and conditioning power the cooling system will stay off until one of these key indicators happens. In some embodiments, the air conditioner is electrically isolated in order to prevent shorting issues and back-feeding as well from the outside power source, from the trailer frame conducting electricity. In some embodiments, there is an insulated non conducting barrier between the air conditioner and the enclosure and frame of the trailer.

In some embodiments, the system may include heating elements that are adapted to operate at 12 volts DC. These heating elements may be used to add additional heat to the system in order to keep the enclosed batteries within a useful and efficient temperature range. The heating elements may be controlled by the inputs of the thermostat. In some embodiments, the system may include (DC) electric fans strategically placed in the enclosure to help uniformly cool and heat if necessary the key components as well offering better airflow through the enclosure. These (DC) motors, which are powered by the battery bank, will also be controlled via shut off switch and will start only as needed to ensure low power consumption and will be run only when either the heating or cooling system is running or when the unit is harvesting and conditioning electric energy.

In some embodiments, a battery voltage sensor is placed in line with the wiring going from the batteries to the inverter, so if the voltage in battery bank drops too low, this sensor will relay this and switch off the inverters so as not to damage the inverters. It will shut off the electric output to refrigeration unit, the air conditioning unit used to cool enclosure, and the power line going to the auxiliary power for the truck or vehicle cab so as to not power down the STC generator head in the system under load. If this happens there is a high likelihood of demagnetizing the STC generator head and then the power system will not work to power the refrigeration unit with 3 Phase Power, or single phase power to the cab, and the cooling unit on the enclosure.

In some embodiments, an inline voltage meter monitors the voltage output of the alternators to insure that the built in voltage regulators do not perform out of normal voltage ranges when rotational speeds are at high output, so for example, if all at once the voltage went to 15.5-16.0 Volts (DC) on a 12 Volt (DC) system this could cause damage to the battery cells so if the input to the batteries got to 15.5 Volts we would want to shutoff the exciter system and if adequate battery power was being generated the unit will stay running until the power in battery bank gets too low.

In some embodiments, a plurality of single phase (AC) motors are supplied with electricity from the inverters in line with the batteries and the fusible disconnect to the electric motor. These motors, like any capacitor motor, may be hard starting so to insure that the inverted power is not overloaded at startup, a plurality of motors are mechanically connected together via a sprocket and chain, a pulley and belt, or a shaft coupling and transmission. In order to aid in initial startup of the (AC) motors, an electromagnetic clutch is used that is connected mechanically to one motor drive shaft and the magnetic clutch will engage upon full startup rpms of the (AC) motors. Then the pulley on the clutch turns a pulley sharing a mutual shaft in mechanical connection to the flywheel and (STC) or (AIG) generator head.

Another way of utilizing the battery power and transforming it into mechanical motion in the motors that are mechanically connected to the each other again is to use (DC) brushed or brush less motors that connect to the batteries through fuselage disconnect and switch to these (DC) motors that would then spin and once up to the right running rpms then the electromagnetic clutch would transfer this mechanical rotation through a pulley to the pulley on the flywheel and generator drive-shaft.

In some embodiments, a flywheel is placed mechanically inline between the pulley attached to the shaft from the electric clutch at one end and the coupling and bearing holders at both ends of the flywheel and generators head common drive-shaft. The flywheel provides torque that is stored in the flywheel to help with the inrush of start-up current that the motor running the refrigeration system uses at startup, as well as the power that is going to the be used to run the cooling, and heating systems, and other high load applications to insure maximum startup current for the needed power consumers.

In some embodiments, when the system is retrofitted to a tractor trailer having an existing TRU refrigeration unit, the system can be configured to meet the customer's power needs for operating the TRU as it is already configured from shore power. For example, if the customer was setup to run 3 Phase shore power at 440 V (AC) the installer could simply wire the outputs in the high power setting of the wires on the generator (STC) or (AIG) generator head, so that the corresponding wires would create the power from L1, L2, L3 and ground respectively. This may not sound like a big discovery but without this feature, one would have to spend thousands on a an inline up/down transformer especially at 15-20 kw power consumption, not to mention that the inline up/down transformer would weigh at least an additional 500 lbs.

In some embodiments, there is a speed sensor attached to the flywheel shaft and a voltage meter attached to the three exported power leads on the generator head i.e. L1, L2 and L3, so that if the system gets up to the proper speed but no voltage is being produced, this would likely be the result of demagnetizing of the generator head. If this is the case, and the generator is not exciting, then when it is at the full input speed, then there will be switchable wire one each attached to the L1 and L2 outputs on the generator head that will briefly supply 12V+ (DC) current to L1 and 12V- to L2 in order to remagnetize the generator. As a result, the operator does not have to worry about this power issue if this were to occur, and would not have to open the enclosure in order to do this.

In some embodiments, a relay monitors the power in the systems and if the batteries get too low and the generator has to shut down, or (AC) shore power is interrupted and the batteries in the mobile power system are too low to run the refrigerator unit on the 3 phase power, the relay will bypass the electric operation if this was selected and keep the refrigeration unit running if the unit thermostat demands that it keep running, and reverts the refrigeration unit back to full time diesel operation, as to not spoil refrigerated cargo.

In some embodiments, the standard refrigeration unit (TRU) is interfaced by connecting the wiring that the refrigeration unit sends the start and run signal to, and we intercept through a relay, and then we switch power to the 3 phase fuseable disconnect, to power on, and then the mobile or trailer/truck generated 3 phase power runs the refrigeration system.

In some embodiments, the system may be adapted to integrate the shore power that is at a loading dock into useful energy that can be utilized by the refrigeration unit and the cab climate in the truck. In most areas of the country, it is very expensive to have 3 Phase power for a building, so if the warehouse or loading dock had only 1 Phase (AC) the inventive system can utilize this single phase shore power to run the single phase motors to produce the grid quality 3 phase power via the STC or AIG generating head, to run the refrigeration needs on the truck/trailer system, and also have the 110 V (AC) or 220 V (AC) or the DC power from the batteries power to the cab just as is done with the generated electricity from this system. In some embodiments, some more of the electricity in both L1 and L2 to may be sent through a bridge rectifier, and the rectified (DC) power may be used recharge the battery bank while the system is plugged in btoy shore power so that it would start out higher than it would be without recharging while parked at a loading dock, or while parked in a truck stop with metered power to run the reefer and the auxiliary power needs of the cab.

If a loading dock or truck stop already has three phase power, the STC or AIG generator may be bypassed and the L1 leg of the 3 Phase may be bound to the neutral to get shore powered 110V (AC) power or take L1+L2 of the 3 Phase Shore Power and output 220 V (AC) to the auxiliary power needs of the cab, and then as before the now three legs L1, L2, and L3 are each ran through a bridge rectifier and this rectified (DC) power is used to recharge the battery bank while the system is plugged in by shore power so that it would start out higher than it would be without recharging while parked at a loading dock, or while parked in a truck stop with metered power to run the reefer and the auxiliary power needs of the cab.

In some embodiments, the system includes a selector switch that allows for either diesel standard operation, or electric power produced by the inventive system, and shore power for seamless integration with the refrigeration unit. This gives the operator the choice of running on either the diesel that the reefer motor requires or running on 3 phase power produced by the system. It is assumed that it is a hybrid diesel/shore powered electrical system already.

System Configuration for Refrigerated Units (TRU) Lacking an Electric Motor

In some embodiments, the system includes an interface that mounts a 3 phase motor to the refrigeration unit and wires it with the system. The 3 phase motor may be mechanically coupled with the refrigeration compressors so as to be able to power the refrigeration system instead of the diesel motor. In some embodiments, the motor may be placed below the TRU, and holes and notches may be cut into a bottom side of the refrigeration unit to allow for a pulley interface with the compressor and to allow the electric motor to power the refrigerator compressor. In some embodiments, a dual electric clutch may be used for the compressor interface on the refrigeration unit.

In some embodiments, custom motor mounts may be used to attach the electric motor to either the refrigeration unit (TRU) frame or into the actual trailer through holes and bolts in the motor mounts.

In some embodiments, the motor should be covered for both environmental and cosmetic reasons. The motor may be covered to protect the motor from exposure to rain, slow, sleet, ice, sand, or road salt. For cosmetic reasons, the motor may be covered by either a wood, plastic, sheet metal, or canvas fabric.

System Configuration for Providing Auxiliary Output for the Cab of the Vehicle

In some embodiments, the system includes a power cord having various numbers of wires that extend from the power generation enclosure to the front of the trailer. The wire(s) would have a male and female plug that would electrically connect the power generation and conditioning system to the cab of the vehicle to power the air conditioner, heater in the cab, and block heater for the diesel motor.

In some embodiments, power may be provided through the output wires that is either single phase 110V (AC) 220 V (AC), or even (DC), to have a 12V (DC) interface to take some of the power in the battery bank to recharge the truck vehicle system. This could be transferred from the system to the truck system by a wire and plug assembly as well. If the truck system already has an inverter system it could just use the (DC) output to batteries of the truck to supply (DC) power to the batteries to just use the Inverter on the truck.

Detailed Description of the Drawings

Illustrative but non-limiting examples of the present invention are shown in the drawings. The system in accordance with embodiments of the present invention pertains to a kinetic energy harvesting system that will harvest a small portion of the kinetic energy of a vehicle system 4 as it travels down the road. While the invention is described with respect to a truck such as a tractor/trailer combination, it will be appreciated that with slight modifications, the invention may be useful with RV, Buses, railroad Cars, and it in its present form it will work as a pull behind trailer system for military vehicles as well.

A follower wheel 3 is positioned in contact with an outermost surface 55 of a vehicle wheel or tire 1. The follower wheel 3 is mechanically connected to a shaft 2 that is in turn connected via a pulley 16 to a generator 17. Thus, the generator 17 converts rotational energy of the shaft 2 into useable DC power that is collected and stored in a battery bank 18. In some embodiments, the generator 17 can include an alternator and can convert energy into usable DC power that is collected and stored in the battery bank 18.

When the vehicle 4 is in forward motion, the tire 1 rotates in a first direction and since the follower wheel 3 is in contact with the outermost surface 55 of the tire 1, the follower wheel 3 and hence the shaft 2 rotates in a direction opposite that of the tire 1. When the vehicle is moving forward, the tire 1 on the illustrated side of the vehicle 4 is rotating in a clockwise direction and the follower wheel 3 (and the shaft 2) is rotating in a counter-clockwise direction. Because the shaft 2 is rotating in a counter-clockwise direction, both the pulley 14 and the generator pulley 16 rotate in a counter-clockwise direction. This is useful because many commercially available generators have cooling fans rotating in this direction.

In some instances, the follower wheel 3 is mechanically connected through a bearing 61 to a shaft bearing with splines and a wheel bearing holder 62. As a result, as the follower wheel 3 turns, it turns shaft 2 in the same direction. To apply tension to keep the outermost surface 55 and the follower wheel 3 in contact with each other, a tensioner bar 59 is affixed to the wheel bearing holder 62 so it forces the follower wheel 3 to stay in contact with the wheel/tire 1, and the outermost surface 55. A pivot point 57 on the tensioner bar 59 allows the tensioner bar 59 to rotate and put pressure on the outermost surface 55. This is done by attaching one end of the tensioner bar 59 to a spring 13.

In the event of ice, snow, dust or rocks getting in between the follower wheel 3 and the outermost surface 55, the spring 13 flexes and allows the tensioner bar 59 to move, thereby allowing the rock or other hazard to pass through without causing damage to the vehicle wheel or tire 1, the follower wheel 3 or the tensioner bar 59. Also so the shaft 2 does not bind from constant flexing of the wheels on the trailer/truck suspension, a CV joint 60 is disposed in the shaft 2 so it can flex and not bind. The shaft 2 it passes through a square bearing holder 149 when the shaft 2 extends into the enclosure 10. The square bearing holder 149 is affixed to the shaft 2 and is also bolted to a protective barrier 150 that keep the elements out of the enclosure 10.

In order to prevent the vehicle tire 1 from becoming too hot, possibly as a result of road heat or friction between the tire 1 and the follower wheel 3, a sensor 151 is mounted to the outside of the enclosure 10. The sensor 151 is an infrared sensor that measures heat by emitting infrared waves 152 and then interpreting received IR waves to determine if the tire 1 is too hot. If the sensor 151 determines that the tire 1 is too hot, a signal is sent from the sensor 151 to a disconnect relay 153 that sends a signal to a shutoff switch 155 and to a generator to battery voltage relay 63 to avoid draining the battery by leaving the generators energized. The disconnect relay 153 also sends a signal to an electric actuator 154 that is mechanically connected to a spring 58 and the tensioner bar 59 as well as the spring 13, the electric actuator 154 lifting the follower wheel 3 off of the vehicle tire 1 and takes the tension off the spring 13, allowing the outermost surface 55 to cool off before the electric actuator 154 reverses and lets spring 13 apply force to tensioner bar 59, thereby making the follower wheel 3 come in contact with the outermost surface 55 of the vehicle tire 1 again once the tire 1 has sufficiently cooled down.

Figure 5:
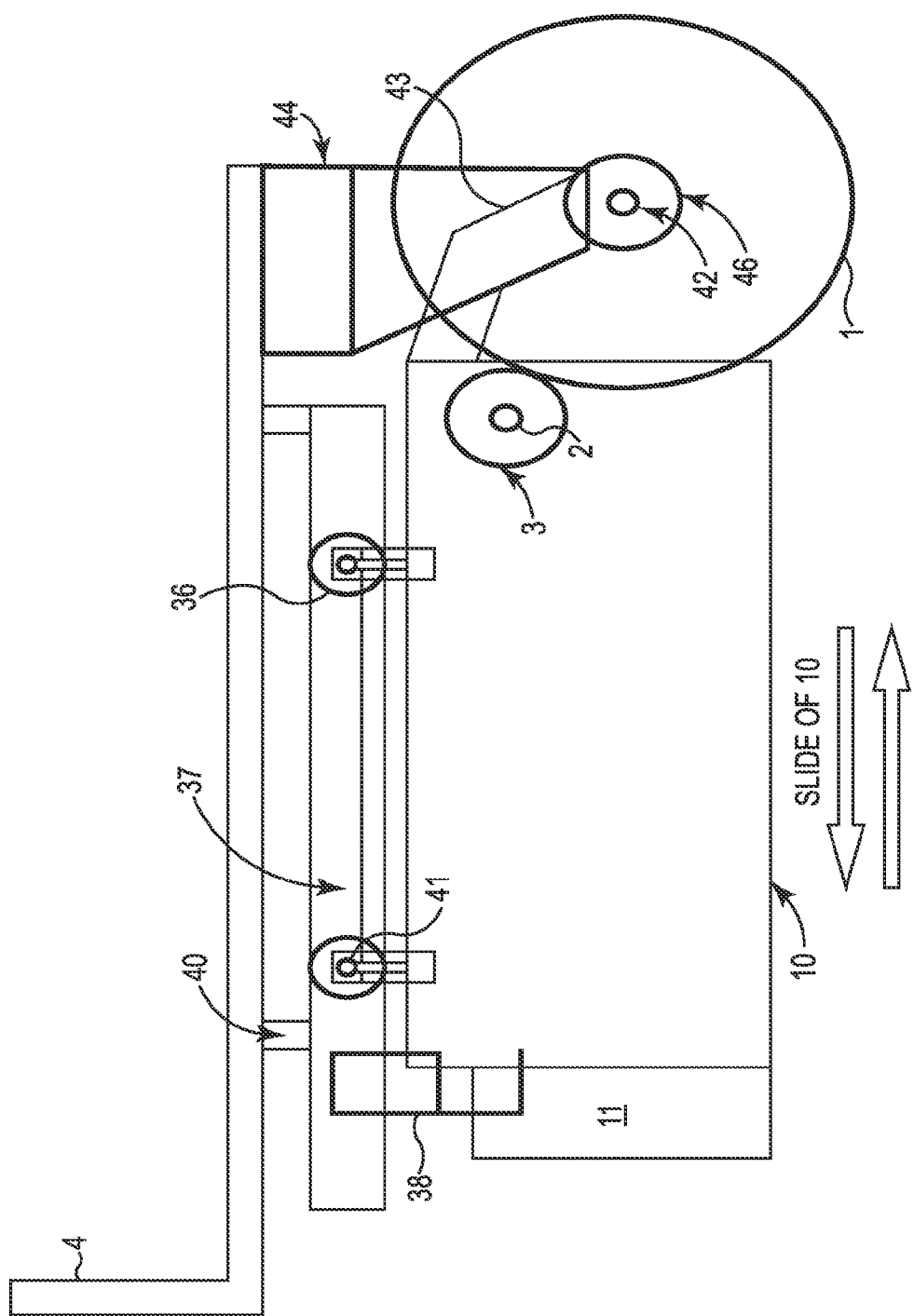
FIG. 5 is a schematic illustration showing a sliding feature in accordance with embodiments of the invention.

As shown in the drawings and particularly in FIG. 5, the follower wheel 3 and the enclosure 10 can slide in order to accommodate sliding of the tire 1 as the vehicle axles are moved to accommodate weight requirements. A lever 38 may be released, letting one or more rollers 36 roll along a track 37 as appropriate. A connecting bar 43 attaches between the enclosure 10 and one or more slide axles 46. As a result, the connecting bar 43 is also removable relative to the slide axles 46, so that if needed all one would have to do is unbolt the connecting bar 43 and the slide axles 46, and the enclosure 10 could slide off the end of the track rail by pulling it off by wheel rollers 36. The enclosure 10 is affixed to the wheel rollers 36 by pins 41 that connect it to enclosure 10 through an L bracket welded onto the enclosure 10 such that pin 41 connects the rollers 36 with the enclosure 10, so that the enclosure 10 would not be considered permanently attached to the vehicle 4. The track 37 is permanently welded to a support 40 that is welded to the underside of trailer frame 4, so that only the support 40 and the track 37 would have to remain on trailer/truck frame 4.

Figure 2:
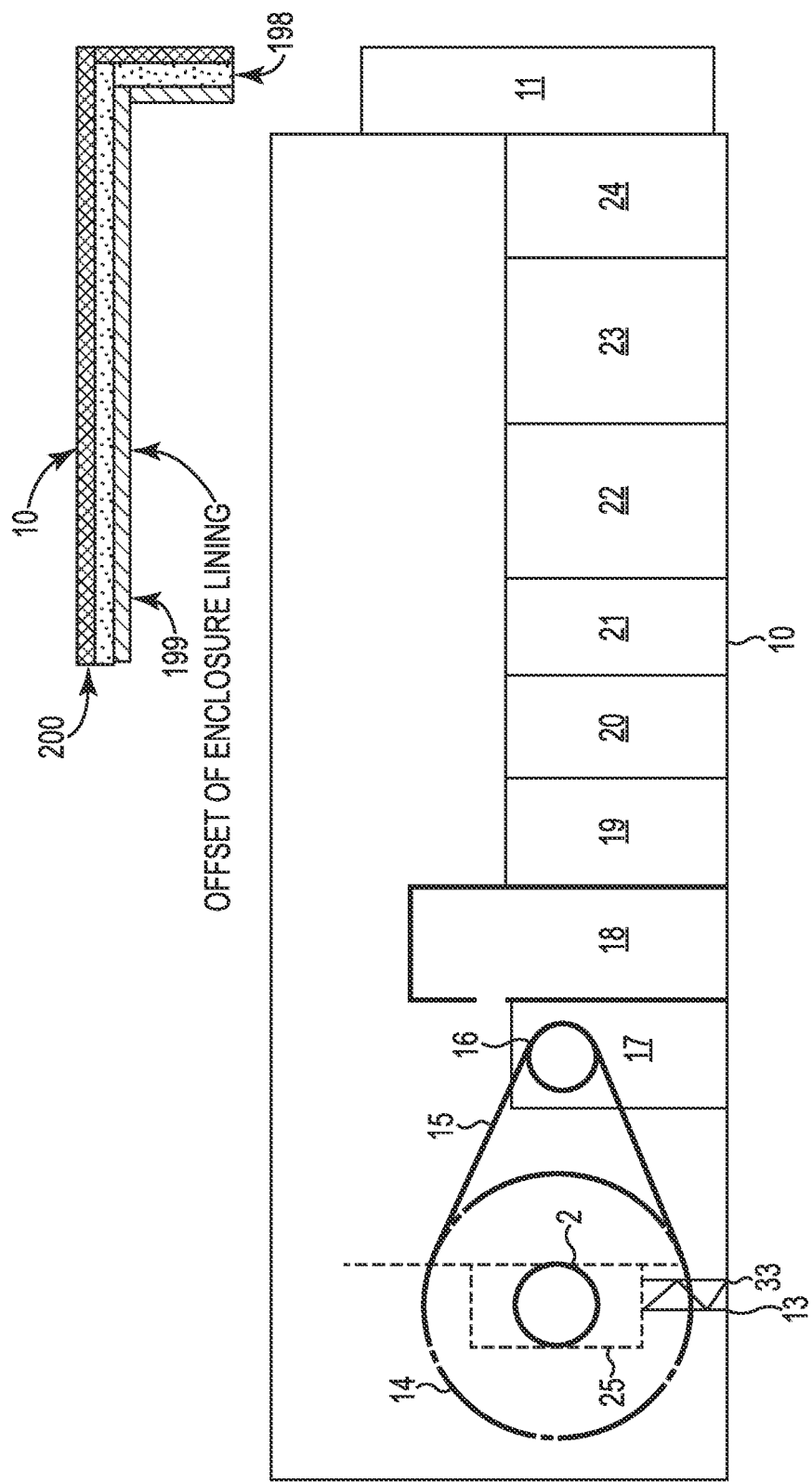
FIG. 2 is a schematic illustration of a power generation system in accordance with embodiments of the invention.
Figure 3:
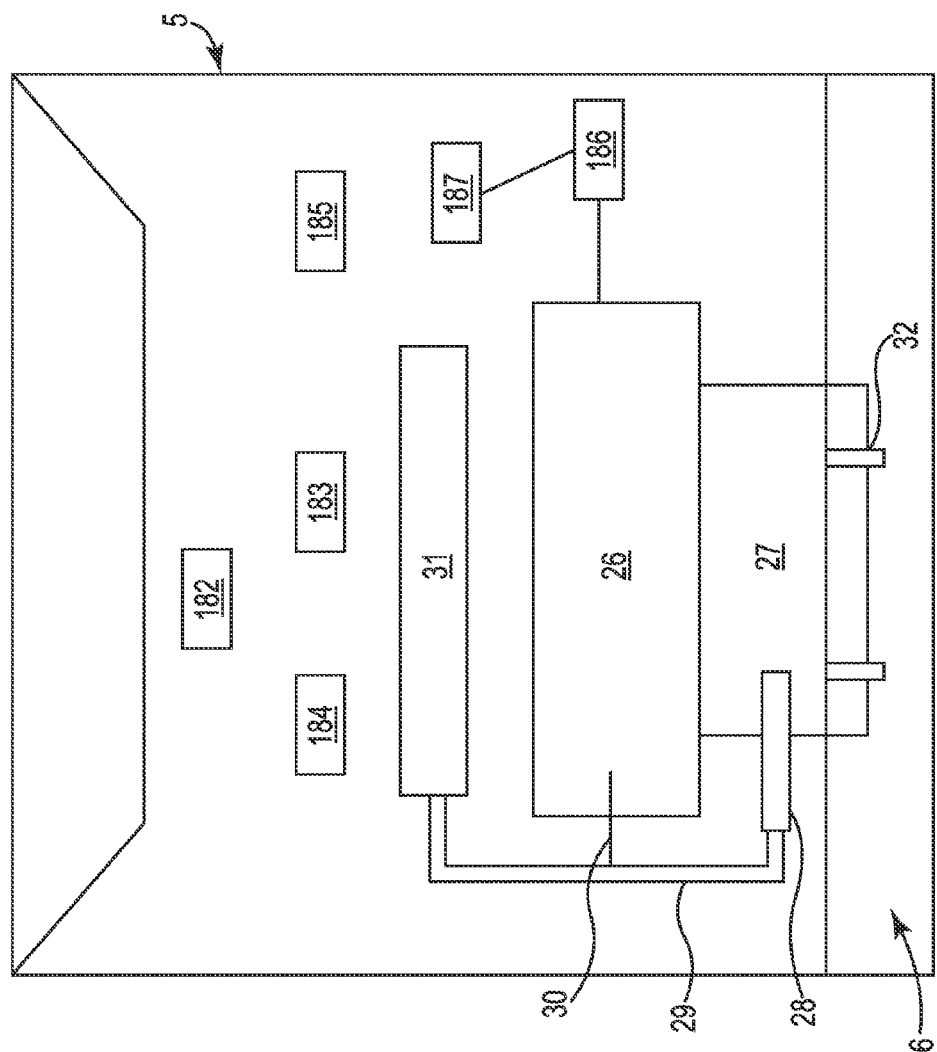
FIG. 3 is a schematic illustration of a refrigeration unit in accordance with embodiments of the invention.
Figure 4:
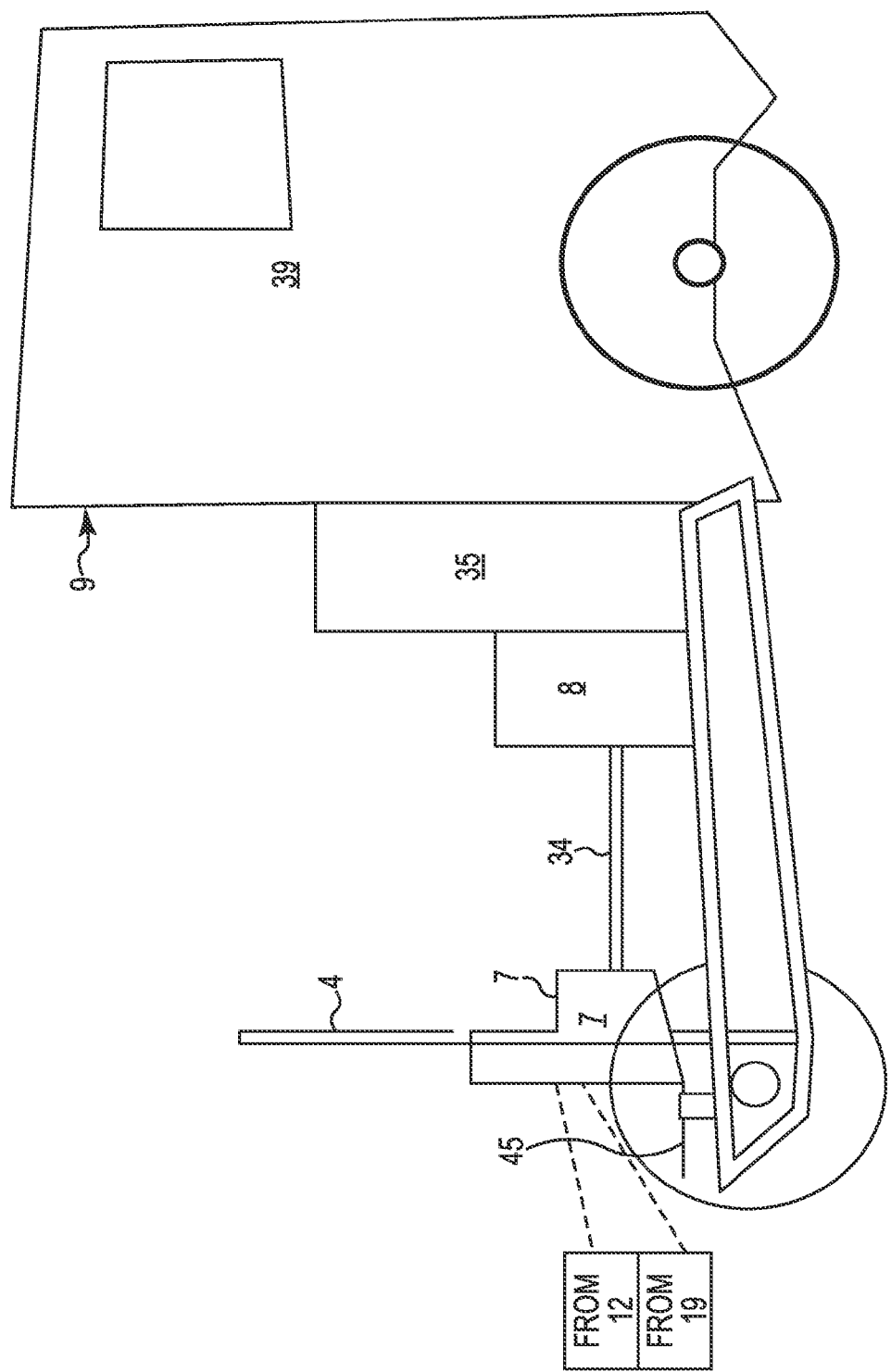
FIG. 4 is a schematic illustration showing how a cab may be powered in accordance with embodiments of the invention.
Figure 6:
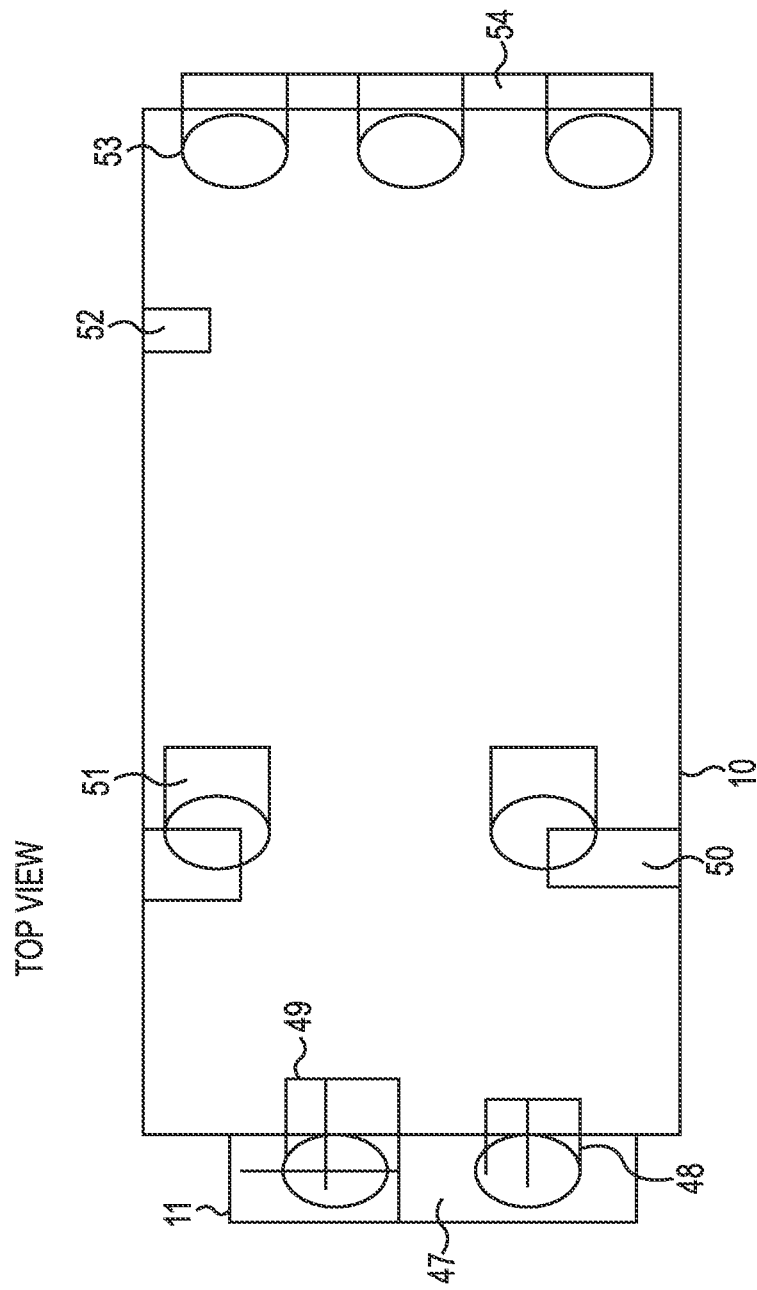
FIG. 6 is a schematic illustration of an enclosure in accordance with embodiments of the invention.
Figure 7:
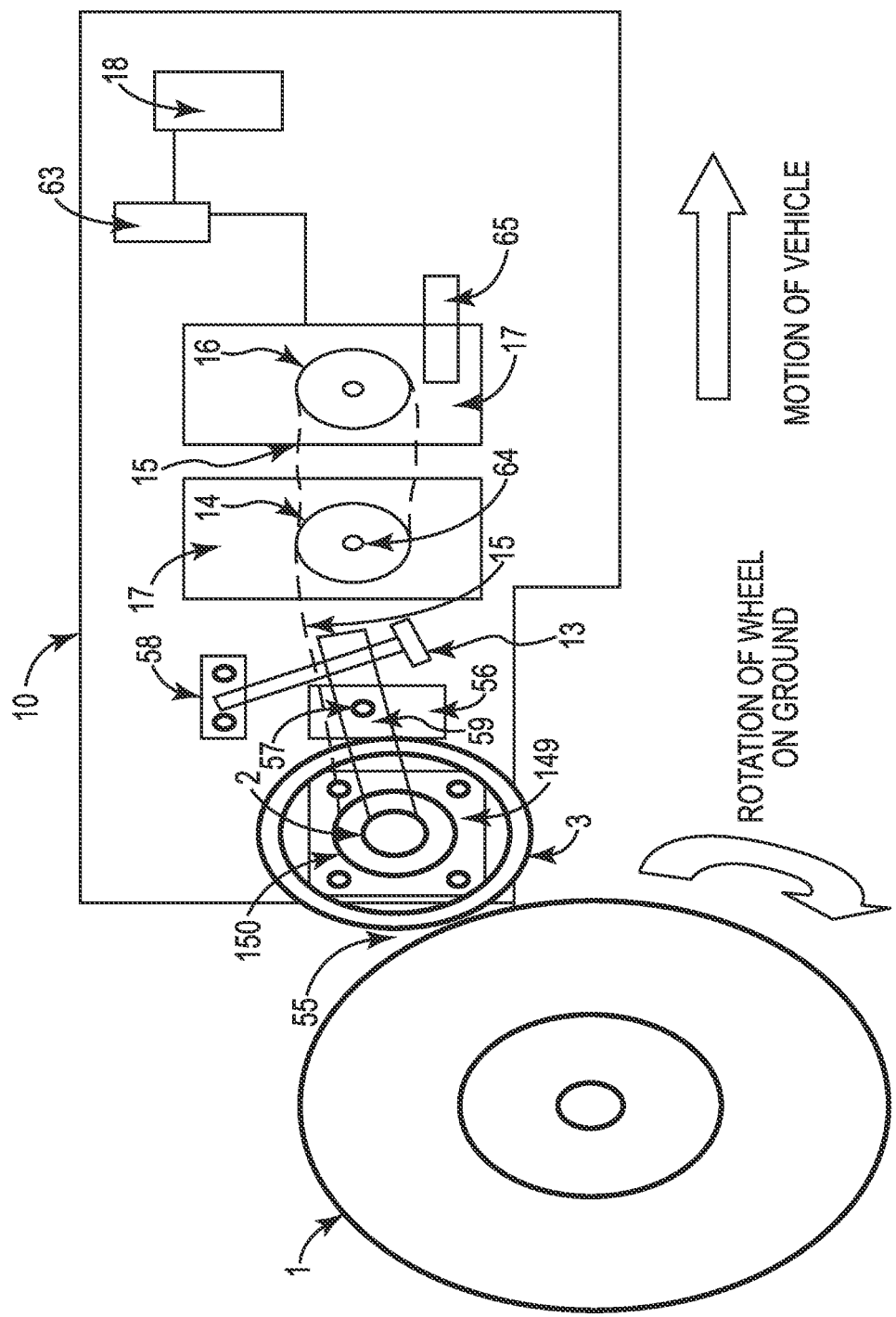
FIG. 7 is a schematic illustration of a follower wheel assembly in accordance with embodiments of the invention.
Figure 8:
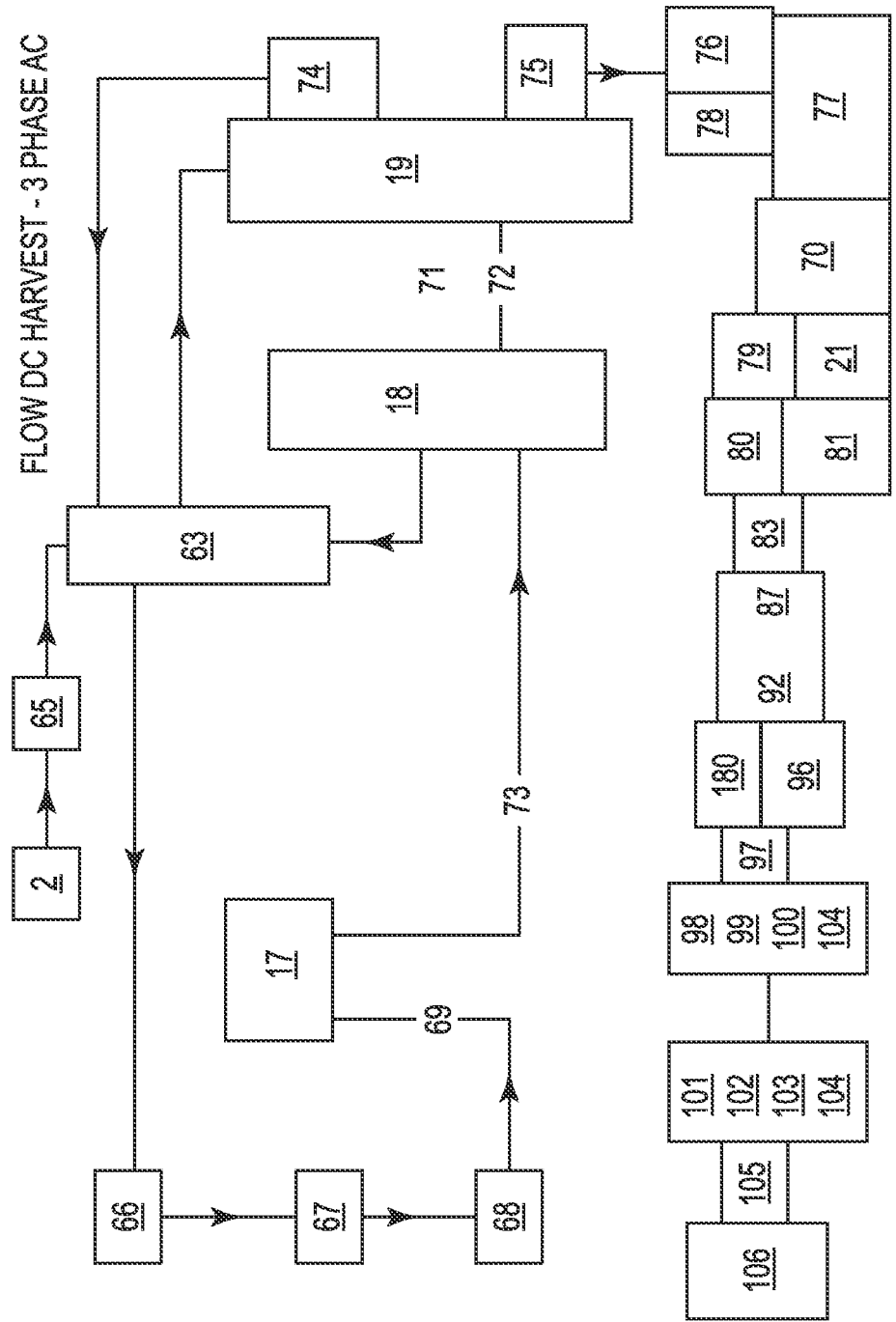
FIG. 8 is a schematic illustration of basic flow of DC harvest to 3 Phase power generation in accordance with embodiments of the invention.
Figure 9:
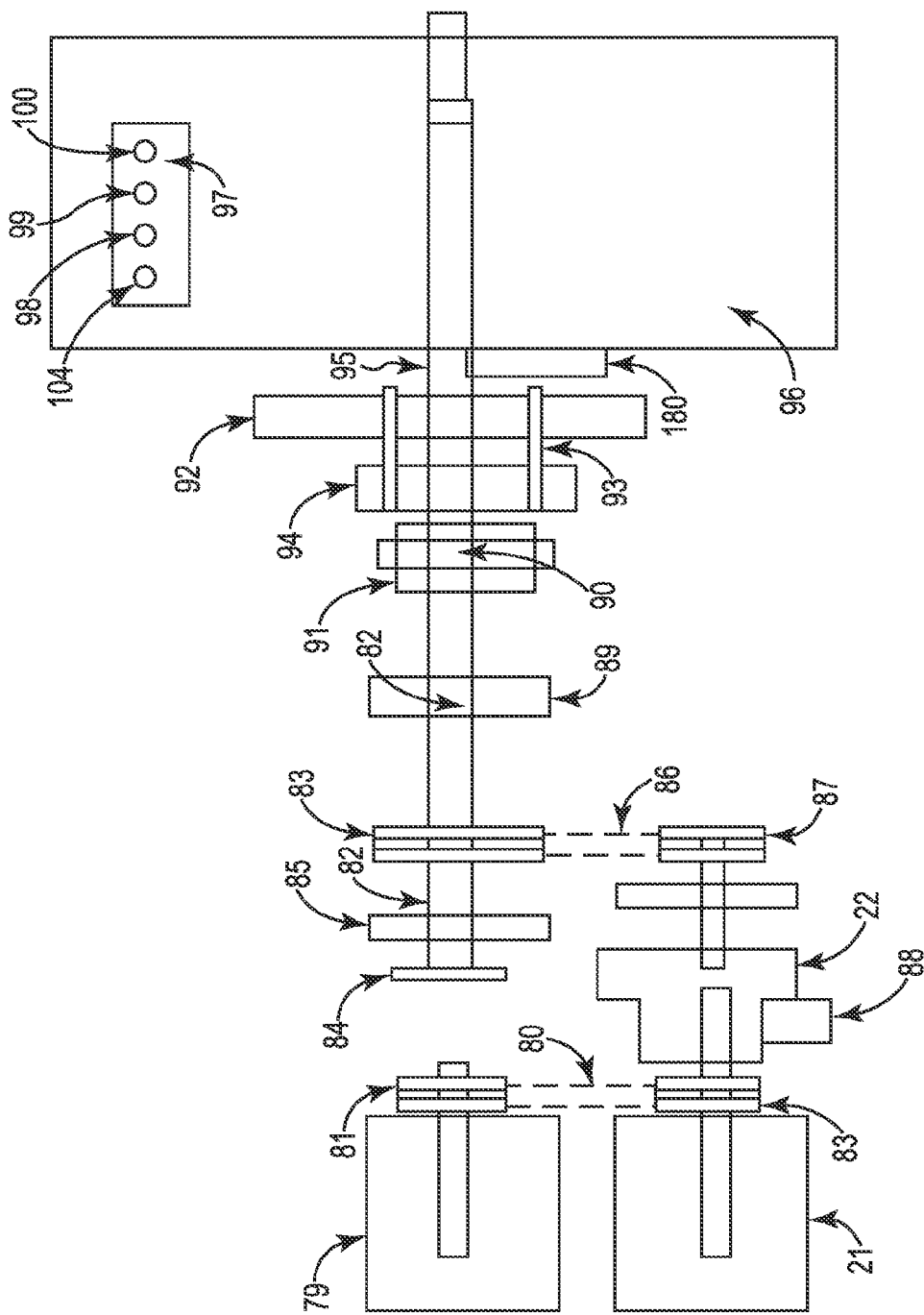
FIG. 9 is a schematic illustration of mechanical components of power conversion generation in accordance with embodiments of the invention.
Figure 10:
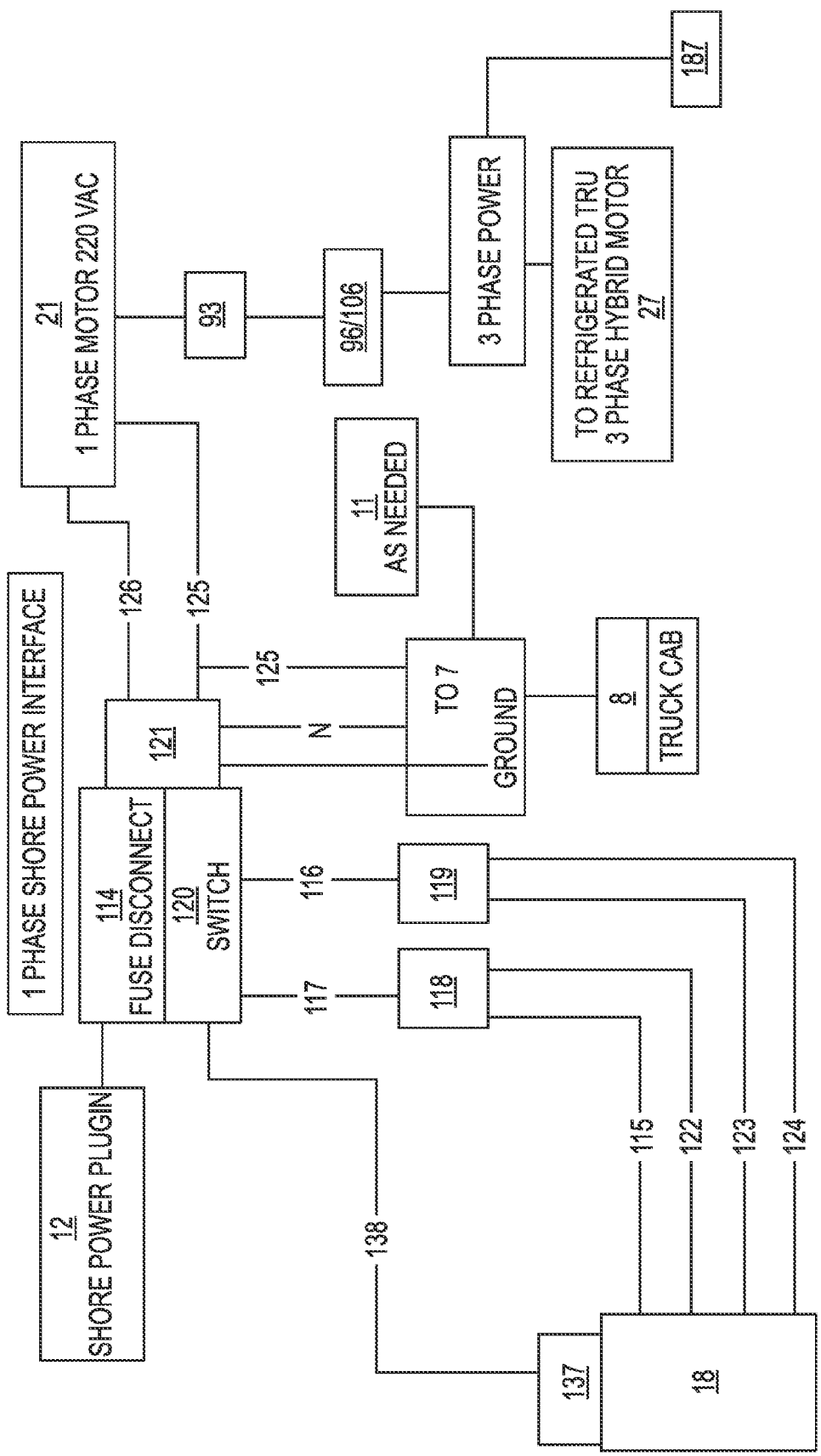
FIG. 10 is a schematic illustration of basic flow with 1 Phase shore power in accordance with embodiments of the invention.
Figure 11:
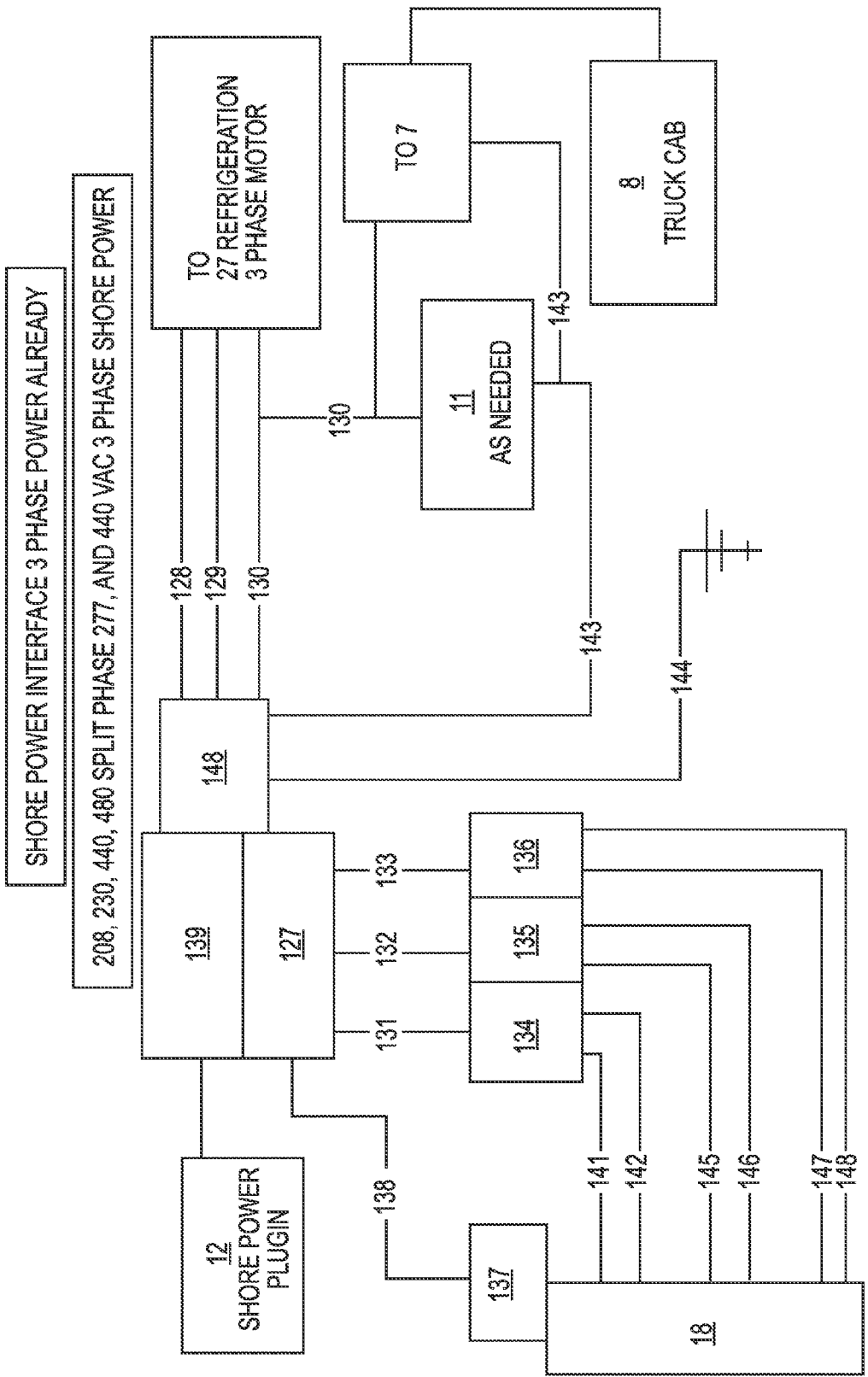
FIG. 11 is a schematic illustration of basic flow with 3 Phase shore power in accordance with embodiments of the invention.
Figure 12:
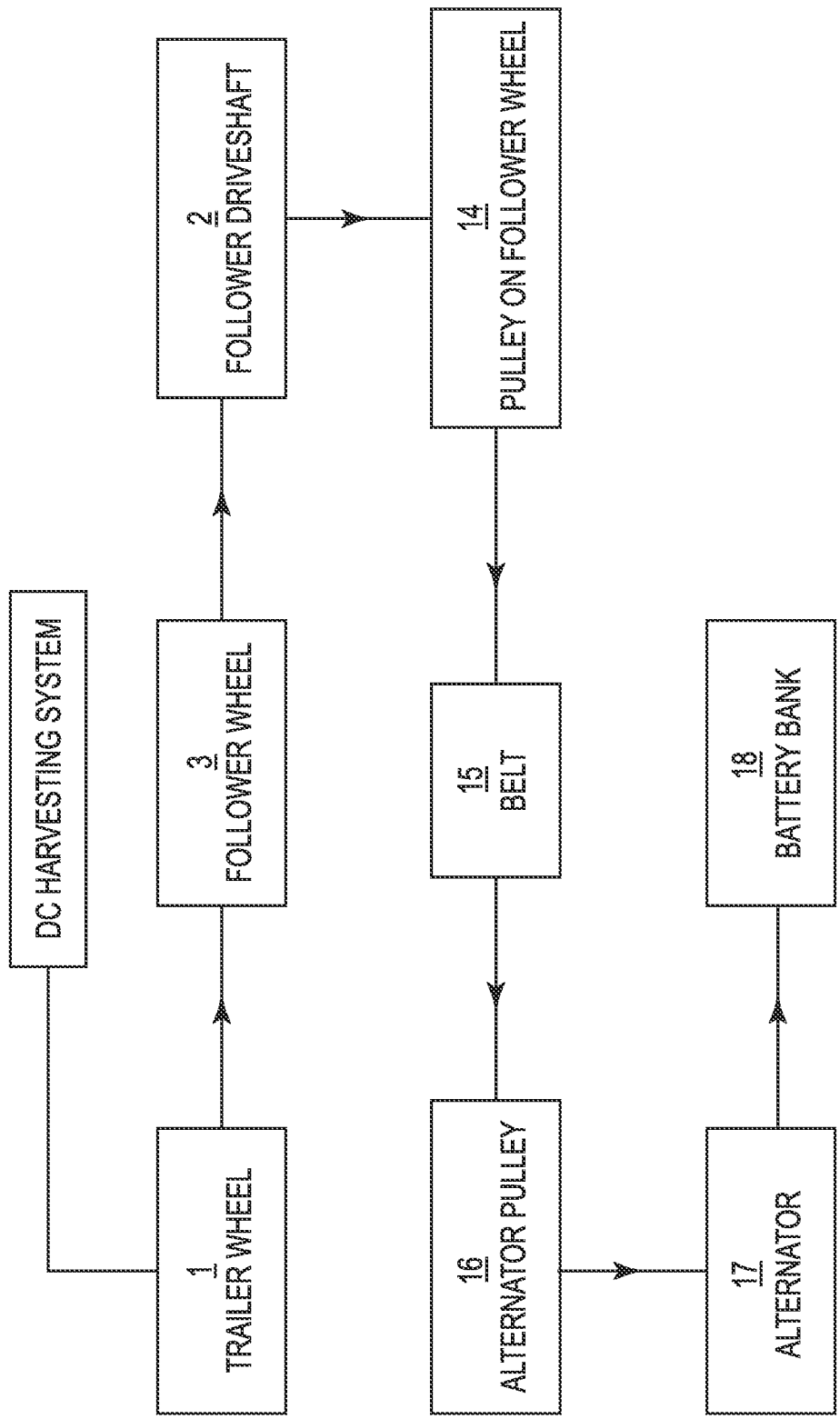
FIG. 12 is a schematic illustration of DC harvesting system flow in accordance with embodiments of the invention.
Figure 13:
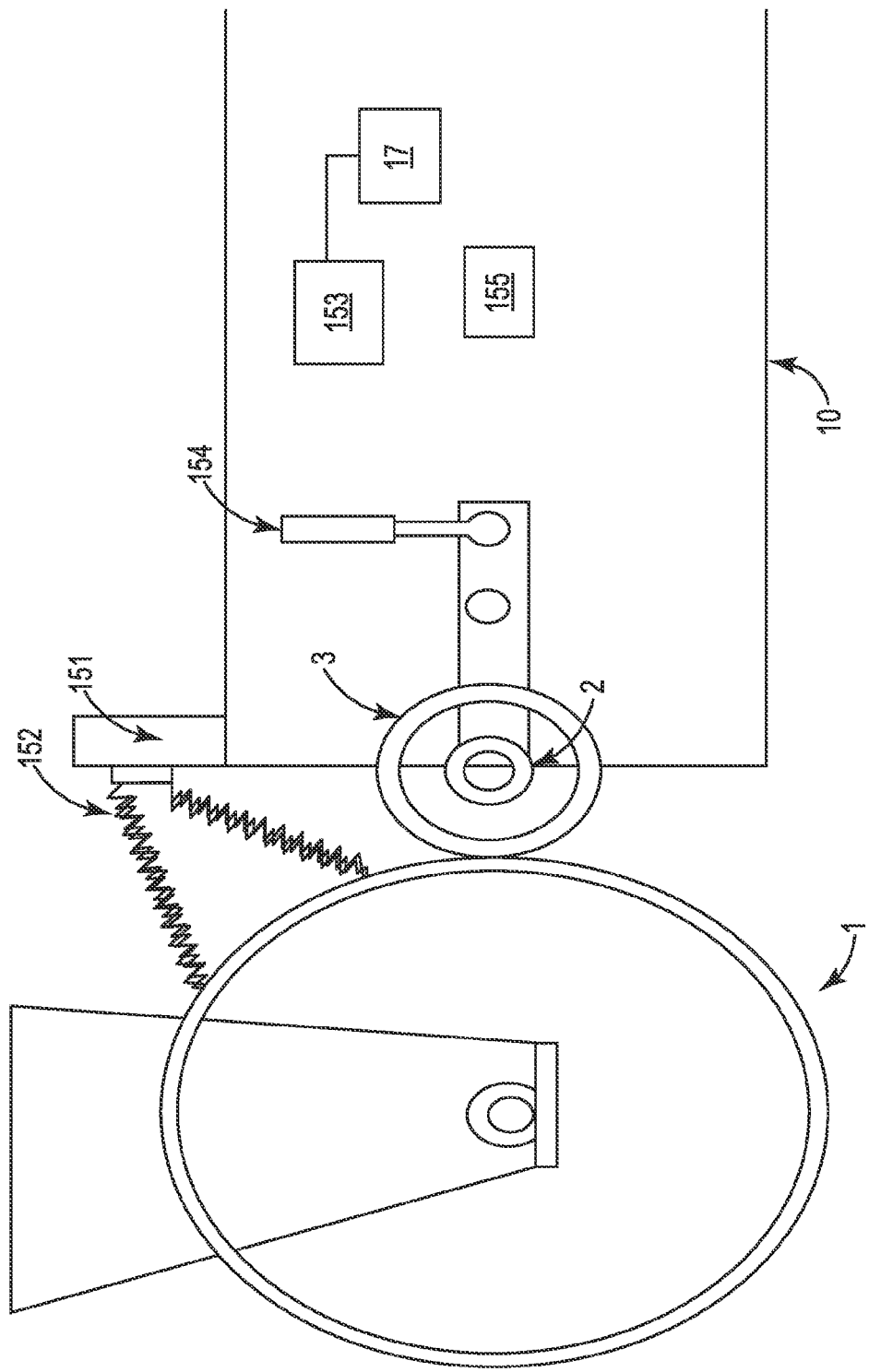
FIG. 13 is a schematic illustration of a follower wheel disconnect system in accordance with embodiments of the invention.
Figure 14:
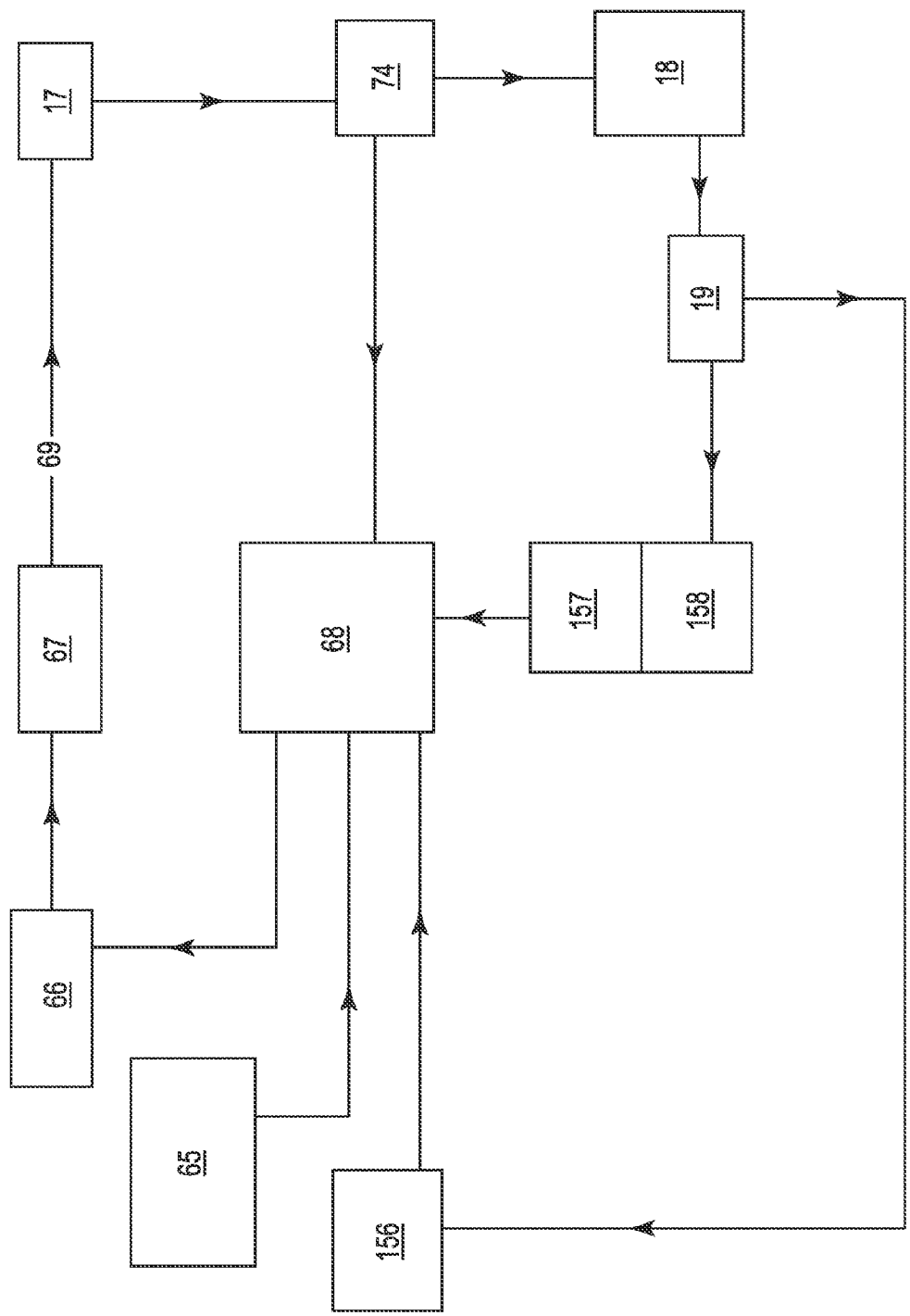
FIG. 14 is a schematic illustration of DC harvesting controls in accordance with embodiments of the invention.
Figure 15:
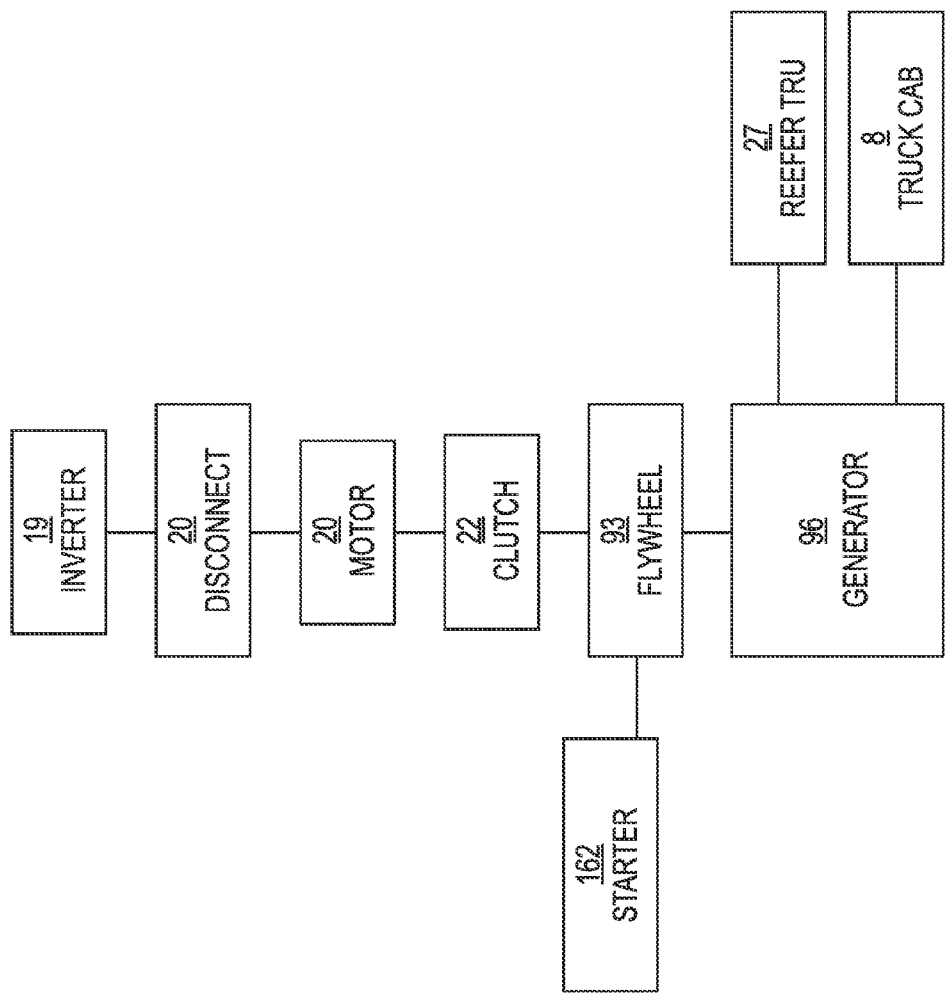
FIG. 15 is a schematic illustration of power conditioning in accordance with embodiments of the invention.
Figure 16:
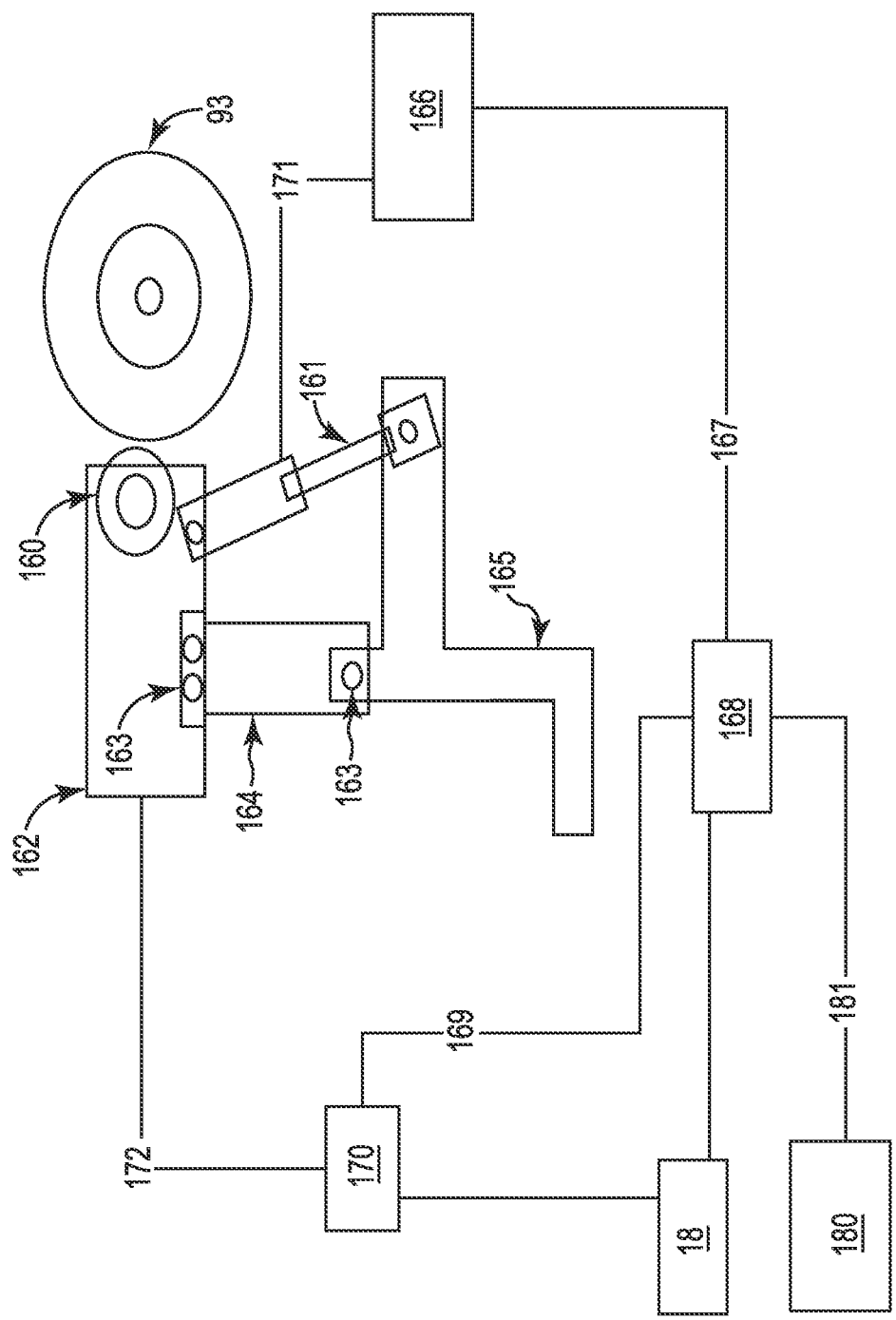
FIG. 16 is a schematic illustration of a flywheel assist motor in accordance with embodiments of the invention.
Figure 17:
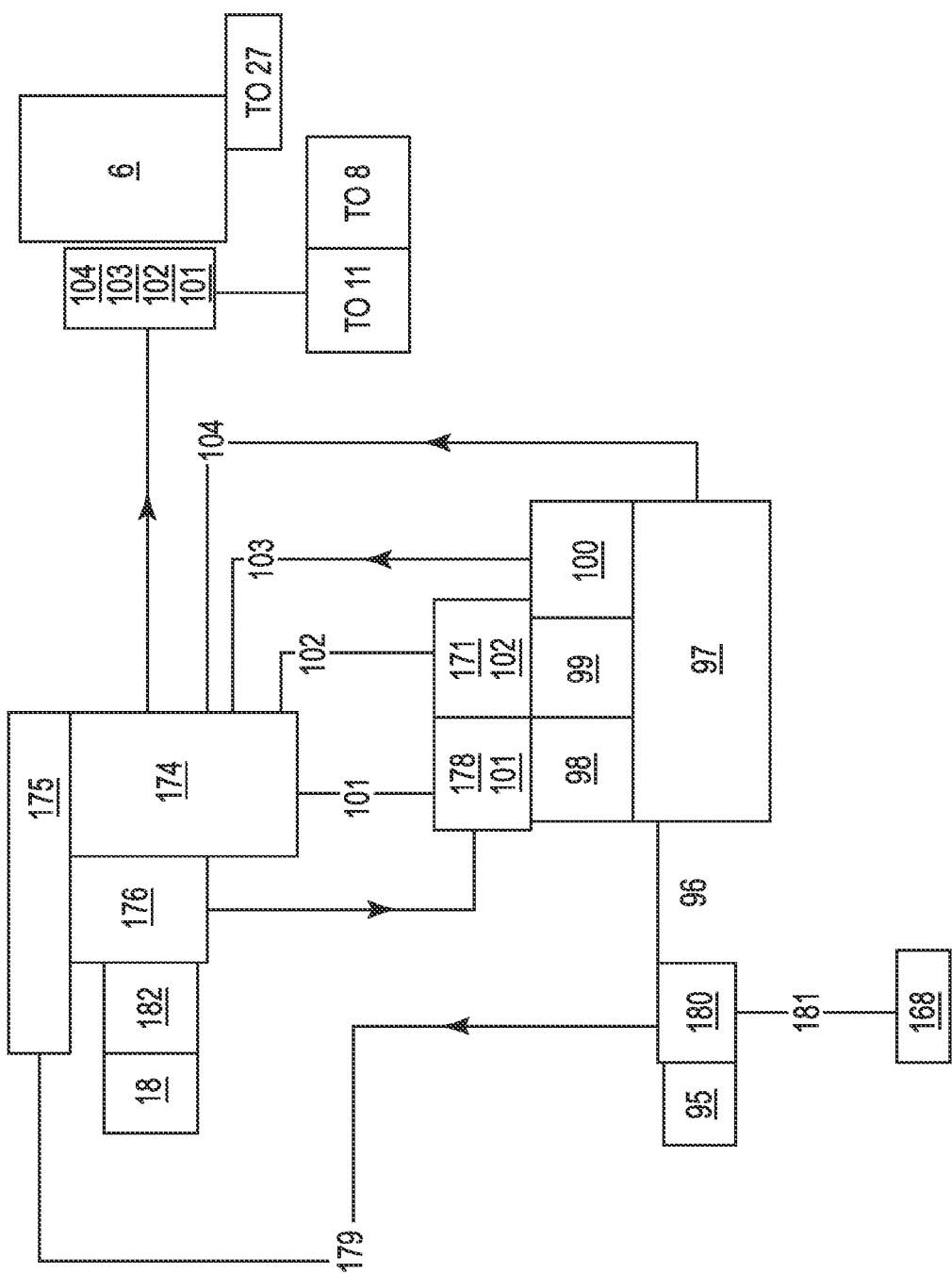
FIG. 17 is a schematic illustration of voltage monitoring and generator remagnetization in accordance with embodiments of the invention.
Figure 18:
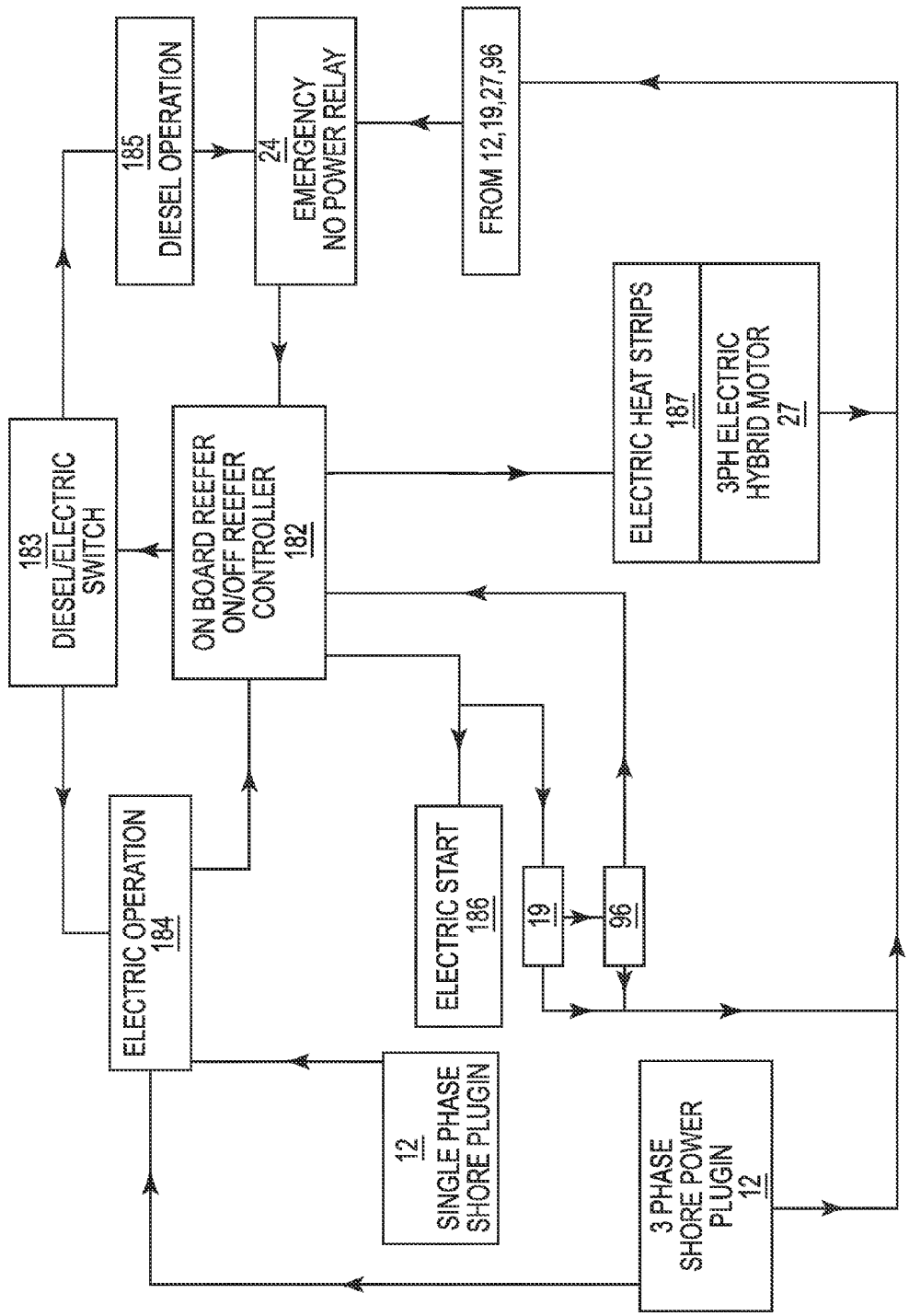
FIG. 18 is a schematic illustration of a reefer interface in accordance with embodiments of the invention.

As shown in the drawings and particularly in FIGS. 2 and 6, the interior of the enclosure 10 is temperature controlled to provide an optimal environment for various electrical components such as the generator 17, the batteries 18, an inverter 19, an electromagnetic clutch 22, a generator head 96 and a starter motor 162. These components function better at temperatures that are in the range of about 60 to about 90 degrees Fahrenheit. Outside of this range, for example, the batteries 18 may have reduced efficiency and less power.

The enclosure 10 is lined with insulation material 198 and an energy dampening foam layer 199. The inside of the enclosure 10 is also lined with a non-conductive insulation material 200 in order to provide an isolated ground. Within the enclosure 10 are sensors 52 that monitor the temperature. If the temperature becomes too high, the sensors 52 turn on fans 48 and 52 to circulate air throughout the enclosure 10. If this is not sufficient, the sensors 52 then turn on an air conditioning unit 11 in order to sufficiently cool the interior of the enclosure 10.

If the vehicle system 4 is in a cold climate, it may be useful to add heat within the enclosure 10 via a heat strip 187. In the enclosure 10, the sensors 52 monitor the temperature and if the temperature becomes too cold, the sensors 52 turn on a DC heating unit 47 and fans 48 to circulate heat through the enclosure 10, and then also on the TRU if the thermostat 182 needs heat it will turn on the heat strip 187 and add heat to trailer 4.

As shown in the drawings and particularly in FIGS. 12-16 and 31, a shaft speed sensor 65 sends a voltage signal to an exciter light 66 if the shaft speed is too low and shuts off the power to the exciter switch 66 that is electrically connected to a 12V light bulb and is connected to a exciter wire switch bus 68, that goes to a line 69 that plugs in the back of the generator 17, thus shutting off the exciter magnets in the generator 17 in order to stop power loss.

In order to know when DC harvesting should commence again, the shaft speed sensor 65 produces corresponding voltages that correspond to the speed of rotation of the shaft 2. When the shaft 2 reaches a shaft speed that corresponds to a vehicle 4 road speed of about 40 miles per hour, the shaft speed sensor 65 sends a signal to the exciter switch 66 that turns the 12V light 67 back on and then tells the generator 17 to create electricity that is carried via a cable 73 to be stored in the batteries 18.

If the built in voltage regulators in the generator 17 malfunction and provide too high a voltage, a voltage meter relay 74 that is electrically inline between the generator 17 and the batteries 18 send a signal to the exciter switch 66 that does the same as above and shuts down the 12V light bulb 67, the tie-in bus 68, the generator exciter wires 69 and the generator 17 so that the batteries 18 are protected from overcharging, also if this occurs a lighted indicator 158 will flash.

In the event of too low of voltage from the generator 17 to the batteries 18, a voltage meter 74 will send a signal to lighted indicator 156 that the battery 18 and the generator 17 are getting low or no voltage output while the 12V light bulb 67, the tie-in bus 68 and the generator exciter wires 69 are still operating correctly.

The DC battery bank 18 is connected to the inverter 19 through cables 71 and 72. A switch 157 turns on the inverter 19 so that a modified sine output 75 is created and is transported to plug wire 76 where it inputted in fuse-able disconnect 77 and wired to input 78 which switches on and off the output 75 providing AC Power to motors 79. In the event that the voltage meter 74 shows low input dc from the batteries 18, through cables 71 and 72, then the voltage meter 74 turns off the switch 157 that shuts down the inverter 19 preventing possible damage to the inverter 19.

Cryogenic treatment of motors and generating equipment enhances the life and operational productivity of these key entities on the system, including the generators 17, the inverters 19, the electric motors 22, the 3 phase TRU motor 27, the single phase motors 79, the generator head 96 and the starter motor 162. Cryogenic treatment has been found to increase power in motors, lower startup currents in motors and produce more efficiency in alternator and generator output.

To condition the power created thus far, electric motors 79 are energized via a power cable 70. In some embodiments, a plurality of electric motors 79 may be mechanically coupled via a common drive belt 80. Once the motors 79 have reached full output speed of about 3000 rpm at 50 Hz, a magnetic clutch 22 is energized by a power cable 88. The horsepower provided by the motor or motors 79 may be transferred to a drive pulley 87 that is in communication with a drive belt 86 that connects to a pulley 83 that is attached to a generator drive shaft 89. The generator drive shaft 89 rotates around bearing holders 90 and is coupled to a flywheel driveshaft coupling 91 to be affixed with a flywheel 92. The flywheel 92 is coupled to the generator head 96 so that as the motor 79 turns and the clutch 22, the generator drive shaft 89 is turned and thus the generator head 96 is turned. As the generator head 96 reaches an appropriate rotational speed, then a desired output in both frequency and voltage is produced.

Because inverters 19 do not have as much input current capability as shore power, it may be useful to have a starter assist in getting the flywheel 92 up to speed so that the motors 79 do not overheat. Thus, upon switching on the motor 79 and the clutch 22, a relay 168 energizes an actuator switch 166 to activate an actuator 161 and cause the actuator switch 166 to contract, allowing a pivot bar 164 to rotate until a wheel 160 is tight against the flywheel 92. The relay 168 energizes a starter switch 170 that energizes a car starter motor 162 and causes a shaft of the starter motor 162 to turn the wheel 160 which starts moving the heavy flywheel 92. Once generator shaft 95 reaches a proper rotational speed so as to not stall out the motor 79, then a sensor 180 relays this to relay 168 and then a signal is sent to shut off the starter motor 162 and then the actuator switch 166 reverses the direction of the actuator 161 and thus pivots the bar 164 to disengage the starter wheel 160 from the flywheel 92 so that starter motor 162 doesn't continuously turn unnecessarily, causing wear. These components such as the clutch 22, the relay 168, the starter switch 170, the actuator switch 166, the electric actuator 161 and the car starter motor 162 are all electrically powered by the DC battery bank 18.

When the generator head 96 is energized, it will produce outputs from a generator output bus 100, including L1 101, L2 102, L3 103, Ground 144, and Neutral Tap 143. By combing various wires on the generator output bus 100 with generator windings one can wire the generator head 96 so the voltage can be changed to allow both single and three phase power simultaneously without having to use a transformer of any kind. The proper voltages are monitored by a voltage meter 174.

For smooth operations, it is useful that the power condition systems not stall the generator head 96 under electric load to either the air conditioning cooling unit 11, an added 3 Phase motor 27, or a truck/tractor cab 9. If this happens, there is a chance that the generator head 96 will demagnetize and spin like a generator but not produce current, if this happens the system will re-excite the generator to produce the desired power.

The system is designed such that a driver does not have to manually monitor the situation and manually re magnetize the generator head 96. Firstly, a voltage monitor 174 has input leads from the generator head 96, that come from wiring bus 100 on the generator 96, these leads are L1 101, L2 102, L3 103, ground 104, then a voltage monitoring relay 175 monitors a shaft speed sensor 180 located on a shaft 95 so that as it spins at the proper rotational rpm it should have a corresponding voltage and Hz frequency so in the event that shaft speed is fast and there is no voltage output at 100 to 174 then this would mean that the generator head 96 was shutdown under load, and then relay 176 the remagnetizing relay will send 12VDC through 177 and 178 to 101 and 102 respectively in 5 second zaps a number of times until 96 generator recreates its magnetic field. The VDC is supplied from battery bank 18.

It will be appreciated that being able to be parked at a loading dock and being able to utilize single phase shore power, and being able to produce 3 phase power has several advantages over the usual method of having to have 3 phase infrastructure with the costly expenses of additional wiring. Larger and more expense main power feed transformers of 3 phase are very expensive in comparison to single phase power feeds. Accordingly, the system is configured to take in shore power from a plug 12. The power will pass through a fusible disconnect 114. If an electric reefer control 184 gets a signal from the thermostat 182 that it needs to operate, then a switch 121 carries the single phase power to motor 21 to start the rotation of the flywheel 92, and the generator head 96 is up to speed then as before with mobile power conditioning by running the single phase power and transforming it mechanically, then the output bus 100 exports pure three phase power to run the added 3 Phase motor 27 and or the heater strip 187. The switch 121 diverts part of the power to a fusebox 8 on the cab without running it through motors 21 so the cab comforts and auxiliary power can be fed as well.

At the fusible disconnect 114, there is another diversion through switch 120 where L2 from shore power 116 and L1 from shore power 117 are then ran through a rectifier 118 and a rectifier 119 where the power from these 2 power lines are converted to DC voltage that is then fed to the batteries 18 by wires 115, 122, 123, and 124. Element 137 regulates how full the battery bank 18 is and when full element 137 sends a signal through a relay wire 138 back to L2 129 to shut off the fusible disconnect 114 power feed until the element 137 measures a lower voltage potential in battery 18. This can allow the invention to be full of DC power in battery 18 upon leaving loading dock if long enough.

Three phase shore power may be used for auxiliary power and to recharge the batteries 18. This is the best way to still power the Cab 8 and run motor 27, the air conditioning cooling unit 11 and the heat strip 187 off of shore power, and still recharge the battery bank 18. This is achieved by plugging into the plug 12 from shore power source and then fuse and disconnect 139 then as with single phase 140 switches on L1 128, L2 129, and L3 130 when the thermostat 182 needs the reefer to run and be regulated through the electric reefer control 184 to power the motor 27 and the heater strip 187 as needed. Also single phase 140 switches the ground wire 144 and neutral tap wire 143 in conjunction of L2 129 and L3 130 to power the cab 8, and also power the air conditioning cooling unit 11 as needed to cool the enclosure 10. As the invention is parked at a loading dock, all features of the AC power will work as single phase. Switch 127 switches on L1 131, L2 132, and L3 133, so they run through a rectifier that converts the AC to DC power through L1 134, L2 135, and L3 136. DC power is carried through pos cable 141, neg cable 142, pos cable 145, neg cable 146, pos cable 147, and neg cable 148 to battery bank 18, thus recharging as needed. This is also regulated by the element 137 and the relay wire 138 sends a signal to turn on and off switch 127.

Auxiliary power may be provided in one of two ways, firstly by running the system just like above where the motor 79 starts to run the generator head 96 and the leads on the output bus 100 feed L1 101, L2 102, ground 104 and neutral tap wire 197 and goes through a controller 188 if this method is selected through switch 190, then these power feeds L1 101, L2 102, ground 104, and neutral tap wire 197 are exported though plug 7 to power cable 34 to fusebox 8 where it powers cab 9, and electrical components 39 and goes through circuit breaker disconnect 35.

A second method for making AC shore power is for inverter power select switch 189 to be selected and this is controlled through auxiliary power control relay 188 that turns on/off the inverter 19, and then the battery 18 powers the inverter 19, and the inverter 19 exports L1 193, L2 194, neutral wire 195, and ground wire 196 to transfer switch 192 where wire carries power to plug 7 and power cable 34 bridges plug 7 and fusebox 8, and circuit breaker disconnect 35 protects the cab 9 and electrical components 39 from damaging currents. Also for DC Power transfer as needed, the battery 18 could supply DC power to fusebox 8 to power needs of the cab 9 so that the needs of the electrical components 39 for DC can be met for the block heater, heating, cooling and personal needs of the electrical components 39, such as a DVD Player and an in cab refrigerator, are powered as well through the plug 7 and the power cable 34 to the fusebox 8, to the cab 9 and the electrical components 39.

Auxiliary power may be provided through single phase shore power by selecting via the selector switch 189 that switches the auxiliary power relay 188 to the right configuration when shore power is connected through the plug 12 and then goes through the fusible disconnect 114. The switch 121 diverts part of the power to fusebox 8 on the cab without running it through motors 21 so the cab comforts and auxiliary power can be fed as well. And as needed, the battery 18 could supply DC power to fusebox 8 to power the needs of the cab 9 so that the needs of the electrical components 39 for DC can be met for the block heater, heating, cooling and personal needs of the electrical components 39, such as a DVD Player and an in cab refrigerator, are powered as well through the plug 7 and the power cable 34 to the fusebox 8, to the cab 9 and the electrical components 39.

Auxiliary power may be provided through 3 phase shore power by connecting the shore power plug 12 on the vehicle 4. The shore power goes through the disconnect 139 then through the switch 140, which switches the ground wire 144 and neutral tap wire 143 in conjunction of L1 129 and L2 130 to power the cab 8, and also power the air conditioning cooling unit 11 as needed to cool the enclosure 10. As the invention is parked at a loading dock, all features of the AC power will work. If there is a need for DC power, the battery 18 could supply the fusebox 8 with DC power as well as stated above with single phase power.

A refrigeration unit (TRU) 5 is integrated into the inventive system via the output signal of the on/board reefer mfg controller 182, which controls the TRU 5 to start or stop according to a set target temperature of the trailer 4. An end user of this invention selects from a button 183 to run the (TRU) on either diesel controller 185 or electric controller 184. So if the user selects electric controller 184 then as need be from the on/board reefer mfg controller 182, the electric operation controller relay 184 tells the electric start controller 186 to switch on power to the motor 27 through either the generator head 96, or the plug 12 to the generator head 96, or through the plug 12 if already 3 phase. And if heat is need to keep a load from freezing then the on/board reefer mfg controller 182 will tell the electric operation controller relay 184 to relay this to the generator head 96 or the plug 12 to supply the heat strips 187 with power.

If no power is received from the plug 12, the inverter 19, and the generator head 96, then the relay 24 will relay this to the diesel controller 185 and revert functions back to the on/board reefer mfg controller 182 and run the diesel system to prevent food spoilage. The once normal power is restored, the user will have to reset switch 183 to start the process again.

ADDITIONAL EXAMPLES

Example 1

Is a kinetic energy harvesting system that includes a follower wheel making contact with the wheel(s) of a vehicle system, and the follower wheel transfers mechanical kinetic motion of the vehicle system, to a drive shaft that is in mechanical communication with drive pulley, the drive pulley is further mechanically connected to a plurality of generators or DC motor turning as a generator producing DC power from the mechanical kinetic energy of the vehicle system's motion. The then produced DC power is then stored until needed, to be used to power the trailer/truck refrigeration unit, other AC and DC power needs, on a mobile basis, and to act as an auxiliary power system for the cab truck system for air condition, heating, motor heating, and hotel needs for the truck as needed remotely and while plugged in; the stored DC power is then converted through an inverter to AC power, and then exported from the inverter to a AC motor where the AC power from the inverter that is producing pulse width modulated square wave or modified sine wave, or pseudo sine waveform AC power is then ran through AC motors that produce mechanical rotation that in turn turns a driveshaft that is mechanically connected to a generator head that produces pure sine wave AC waveform from the wild junk electricity input from the inverter. Alternately, the stored DC power can go through the inverter and on the bus of the inverter then can be allowed for partial diversion of DC power to power a DC motor in mechanical communication with said generator driveshaft thus converting DC power to pure sine wave AC waveform power through the generator head; the DC power diverted to the inverter can still produce AC power that can then be diverted to the auxiliary power system for the cab truck system for air condition, heating, motor heating, and hotel needs for the truck as needed remotely and while plugged in. The generator head thus outputs 3 Phase AC power in pure sine AC as needed to power the refrigeration equipment, auxiliary power systems, and other mobile power demands that this kinetic energy power generator can produce. The AC power produced through the generator head, can and will export AC power in either 3 phase or single phase AC power to either the refrigeration equipment, or the auxiliary power demands on the cab of the truck or vehicle system; if the power pack enclosure is able to the invention claimed can and will import AC shore power in either single or 3 phase configuration, these power sources will plug into the power pack enclosure. The single phase power will be partially diverted to power to bridge rectifier circuits that will take part of the single phase convert it to DC power that will be stored in the power storage bank; the rest of the single phase power will be used to power the AC electric motors that once energized will power the rotation of the generator head, that will then export single and three phase power to the refrigeration and or the auxiliary power needs of the cab. If there is three phase shore power available this will be plugged into invention power pack, and the 3 phase will be partially diverted and the same rectifier circuit will be used to convert a portion of the shore power 3 phase into DC power that is stored in the power bank of this invention; the other power not diverted will be routed through the invention to power the 3 phase motor directly that runs the refrigeration compressor, and the 3 Phase AC power will also be partially exported by taking 1 or 2 legs of the 3 phase and making use of the then single phase AC power to export this power to the auxiliary needs of the cab. Even though the AC power is imported shore power, the control of the electricity is still controlled by the invention and interfaced with the temperature controls of the refrigeration unit; and the auxiliary power export is controlled by invention through a power switch to allow the power generated in the power pack or imported shore power to be exported to the cab auxiliary power interface disconnect.

Example 2

Is an enclosure apparatus known as the power-pack enclosure; this is used to enclose and to help protect the following components of this invention: Alternator/generator DC in the power pack; the electronic controls, the electric motors both DC and AC, the electric switches, relays, control boards, AC power generation equipment, inverter components, battery storage components, capacitor storage components, and the overall invention parts that must be protected in this power pack from the elements such as, but not limited to; ice, sand, gravel, dust, dirt, moisture, humidity, vibrational harmonics, humidity, and extreme temperatures, to still operate.

Example 3

The enclosure apparatus of Example 2; whereas the said enclosure is lined with an energy dampening foam insulation in the inside of the enclosure; to protect the electrical components of this invention from both temperature extremes and mechanical harmonic vibrations; the foam keep the temperature controlled inside the power pack for a more stable temperature inside the power pack; as well as keeping mechanical harmonic destructive vibrations from effecting the precise operation of electronic controls in the power pack that are essential to the overall operation of the invention.

Example 4

The enclosure apparatus of Example 2; whereas the said enclosure has an internal inside the enclosure heating and cooling system to temperature control the operation of the key electrical components; this is accomplished through a series of sensors inside the enclosure to monitor temperature and when the temperature gets too low this invention will turn on the electric heating elements and the fans inside the enclosure will help circulate the air inside the enclosure; upon proper temperatures are reached the heating and fans will shutoff; then upon the temperatures in the enclosure being too hot then the cooling system will start up cooling the enclosure to insure the key electronic components keep within optimum operating temperature ranges, when the internal temperature inside the internal enclosure are achieved, then the cooling system will shut off until and if it is needed again.

Example 5

The enclosure apparatus of Example 2; whereas the said enclosure; is mechanically attached to the trailer or truck vehicle system, through a welded, and or bolted on frame to rail system, that connects the trailer frame with the roller track, the enclosure is making contact through a plurality of rollers that are sliding inside the rail track; the protective enclosure has on the top side of the enclosure has rollers mechanically attached to the enclosure; thus allowing the enclosure to slide along fixed track through rollers, and the slide track is attached to the trailer frame under body, or truck vehicle underbody. Furthermore, the enclosure and the vehicle or trailer wheel by which the follower wheel makes outer surface contact with, are mechanically attached through a link coupling that attached on one side to the trailer wheel or vehicle wheel hub, and the other end of the link attaches to the enclosure. Thus when the trailer or vehicle wheel base needs to change, the drive link that connects the wheel(s) of the vehicle system to the power pack enclosure; allowing the said enclosure to slide relative to the change of the wheel base, without having to readjust the tension on the follower wheel assembly; to change wheel base on the vehicle system, thus allowing for different weight load distribution of vehicle system.

Example 6

The slide roller apparatus of Example 5. Shall have a secondary hand lever safety lock; this safety lock will lock the roller wheels in place inside the slide track; to insure that the proper tension is still applied to the follower wheel assembly of this present invention.

Example 7

The enclosure apparatus of Example 2; whereas the said enclosure has an insulating barrier between the roller wheel (s) assembly and the enclosure, an insulating barrier in the bolts mechanically attaching the enclosure to the roller wheel assembly and an insulating barrier between wheel hub and the connecting link, and the enclosure; thus mechanically connecting all components of the slide system of power pack enclosure and trailer vehicle system, while at the same time isolating the electrical system of the enclosure power pack from the truck trailer vehicle systems; thus creating an isolated ground and electrical system, thus preventing short circuit back feed from the invention into vehicle electric system.

Example 8

The kinetic energy harvesting of Example 1 in which the follower wheel, or plurality of follower wheels that connect and attach onto the and make contact with the wheel vehicle system or trailer, on the outermost surface, this contact enables follower wheel to translate the angular rotation of the vehicle wheel (s) system, without the need of an additional part(s) of a translational transmission to convert the motion of the wheel to opposite motion without wheel on wheel motion; the wheel motion of a vehicle from the back side of the wheel end is clockwise end, and the commercially available alternators and generator, used to produce DC power from rotational motion, have cooling fans that need counter-clockwise rotational motion to cool the alternator or generator, and if the fan blades spin backwards in the wrong rotation convection; whereas follower wheel(s) are mechanically attached to a drive shaft(s) that are enclosed by bearing holders to seal the outside of the described enclosure to seal out the weather and elements through which, the bearing holder that is in conjunction with the follower wheel driveshaft. The follower wheel assembly is also interconnected to the driveshaft with a bearing assembly and wheel hub that contacts and connects to the follower wheel driveshaft through a wheel bearing assembly and splined machined follower wheel driveshaft, that is mechanically connected the follower wheel hub and the driveshaft by machined interconnecting keyways and spline so the driveshaft is thus enabled to wheel thus allowing the transfer of rotational motion on the vehicle wheel s) and the follower wheel to the follower wheel driveshaft.

Example 9

The driveshaft rotation of Example 8 in which when the trailer or vehicle system is in forward motion, the vehicle wheel has clockwise motion looking on from the passenger side of the vehicle; and the follower wheel attached to the trailer wheel is thus turning counterclockwise translating the rotation of the drive shaft to the right rotation convection for the fan blades in the DC generator with the need of a transfer case transmission to accomplish this drive shaft directional spin.

Example 10

The energy harvest of Example 1 is furthermore realized by the interconnection of the follower wheel assembly and the driveshaft connects to a drive pulley on the driveshaft the drive pulley turns the DC motor generators in conjunction with a drive belt connecting the drive pulley to the generator pulley thus making DC power from the kinetic energy harvested.

Example 11

The energy harvest of Example 1 is furthermore recited whereby there is a speed sensor on the follower wheel driveshaft; thus turning on a voltage relay to energize the generator exciter wire to start the energy harvest at the desired rpm and mph; thus when said driveshaft is turning too slow to generate DC power through the generators effectively through this invention; the speed sensor send a relay voltage to the on off switch of the exciter wire, and then if the voltage is too low the exciter wire switch stay off thus not utilizing the excess energy to excite the power generation through the generator; thus saving energy stored in the battery or ultra-capacitor energy storage feature of this invention. Upon successful high speeds on the follower wheel driveshaft, the speed sensor relay sends a voltage reading high enough to turn on the exciter wire switch and the generators and or DC motor generator to charge and or recharge the energy storage feature of this invention. This speed sensor relay has the ability to shut down the energy harvest system and act as a standby harvest system until such time as the driveshaft reaches the desired speed thus saving on the power consumption of the energy storage features of this invention; thus preventing cannibalistic discharge that would occur if the system did not shutdown when not in use or no vehicle system motion or not fast enough to harvest the kinetic energy out of the system.

Example 12

The driveshaft of Example 9 being attached on the opposite end to a drive pulley or drive sprocket that translates the driveshaft rotation onto a drive belt or drive chain that is mechanically connected to the a plurality of generators and or DC generators that accomplish the energy harvest from trailer wheel(s) through the follower wheel(s) assembly. It is furthermore recited that the belt path connecting the follower drive pulley and the generators can be interconnected with one or a plurality of drive pulleys interconnecting several generators this way with one drive pulley; through the use of an idler pulley weaving in and out the generators pulley then a idler pulley then generator pulley, then a belt tensioner pulley to drive more than one generator with one belt and one drive pulley and one belt tensioner to accomplish the energy harvest of this invention.

Example 13

The kinetic energy harvesting of Example 1 in which the generators DC generator motor are mechanically powered by the vehicle kinetic mechanically energy irrespective of a generator that could be directly attached to the drive motor of the vehicle pulling the trailer or the vehicle system; that these said generators and or DC generator motors supply power to the power storage portion of this invention in Example 1 so by using additional generators located in power pack these generators will recharge the separate storage system of this invention that is separate of the battery storage system in prime mover engine power system.

Example 14

The power storage of Example 1, further including a battery storage bank, and or combination battery bank and ultra-capacitor storage bank that is constructed electrically through either parallel or series connection of batteries and capacitors, or a standalone storage ultra-capacitor storage bank, this power bank is thus repowered through the DC generator bank in the power pack, or through the single phase AC shore power being diverted and ran through a rectifying system to output DC power to the power storage bank at the right voltage generation system thus producing 2 legs of DC power from the single phase shore power; the rectifier circuit has a built in on off switch to insure that the power bank is not overcharged but charged; through the 3 phase shore power, thus being diverted to a series of three bridge rectifiers that will convert the AC back to desired DC voltages; the rectifier circuit has a built in on off switch to insure that the power bank is not overcharged but charged; the power storage bank could and will be able to interconnect with vehicle battery bank an there will be an electrical wire connection between the power bank and the vehicle system battery bank, thus allowing DC to DC energy transfer between power pack and vehicle battery bank, thus allowing DC-DC power transfer to power the auxiliary power needs that are DC on the trailer such as lift gates, and the DC power loads on the truck or vehicles system; it is further recited that the invention has a disconnect switch to separate the DC power loads in this invention from the truck/cab vehicle system, thus preventing the vehicle system batteries that are in parallel communication with the invention power pack Example 15

The power storage bank of Example 14; is further electrically connected to a DC-AC inverter, it is further claimed that the inverter imports power from the power storage bank of this invention and through a DC bus on inverter, it is then possible to divert part of the DC power to use as a power source if DC motors are used to power the mechanical rotation of the 3 poly-phase generator head; and still convert a portion of the DC power to single phase AC that could then be directly exported to supply the single phase AC auxiliary power needs of the vehicles system such as air-conditioning heating, block heating of the motor hotel loads such as TV DVD Players, the in cab refrigerator, and other single phase AC power draws; the inverter and the APU system are electrically connected through wiring from the power pack to the cab of the vehicle system and if the invention power pack is attached to the trailer then there shall be a plug interface and cable connecting the trailer to the cab electrically connecting the power pack with the cab truck supply single phase AC auxiliary power needs; through a fusible disconnect and switch the inverter described in this claim can and will be electrically connected to the single phase AC motors to energize and power the mechanical rotation of the electric motors driveshaft.

Example 16

Through the AC power generation and power conditioning of Example 1; the electrically inverted AC from the inverter or DC supplied power bypassing the inverter energize the appropriate motor; the motor(s) driveshaft of these electric motors mechanically rotate when electrically controlled and energized; the electric motor of plurality of electric motors(s) are thus mechanically coupled through either a pulley and drive belt, chain sprocket system, or multiple input transmission box, to mutually power the rotation of generator head shaft; this generator head shaft is mechanically attached through a drive transmission, pulley or sprocket on end of the shaft, in the middle of the shaft there is a flywheel attached to the generator head shaft; in between the pulley, sprocket, or transmission case connecting the motors to the generator shaft, there will be a bearing holder on the outer generator shaft and the flywheel, and there will be a bearing holder between the inside of the flywheel and the generator to have a plurality bearing holders on the generator shaft.

Example 17

The generator drive shaft of Example 16; whereas the generator shaft has a speed sensor on the drive shaft to insure that the proper rotation speed is optimal before generator head is energized under load to start the refrigeration units hybrid electric motor.

Example 18

The speed sensor of Example 17; is furthermore recited to be used as an indicator of said shaft speed and the correlating AC voltage of the poly-phase generator head at the correlated angular rpm; thus if no self excited voltage occurs at a high rpm and indicated in the speed sensor, and monitored through a voltage meter that is electrically connected to the generator starter relay.

Example 19

The no voltage indicator in the generator start relay of Example 18; is recited that if there is generator head de-magnetization, to re-magnetize the generator head, it is to have a DC voltage wired to generator head, for outputs L1 and L2, positive terminal of the vDC connected to L1 and the negative vDC connected to L2 on the generator head wiring block; this in conjunction with diodes and a switch to disconnect the DC voltage and prevent back feed to DC power source; then the generator head while rotating, should be zapped and field flashed for a few seconds and the magnetic fields in the generator windings, the speed sensor and the voltage meter should then tell the if the AC voltage and rotation speed correlate as they should; It is further recited that all this generator head remagnetization occurs in the enclosure, thus not needing the operator of the vehicles system to open the enclosure and try to field flash the generator head.

Example 20

The power conditioning system of Example 1; it is furthermore recited to consist of the generator head that through the generators head wiring block the 3 phase power generation; from single phase AC power source or DC power can be achieved; without the need for an additional power transformer, or variable frequency drive; the single phase power from the inverter entity of the present invention; is conditioned from modified sine or square wave power AC waveforms and when the AC motors are energized and the rotation of the generator occurs the AC waveform is pure sine wave power at various hertz frequencies. The DC power supplied to the DC motors to energize the motor that rotate the generator driveshaft is thus translated to AC and 3 Phase AC through the generator head rotation, and the voltage output is also regulated and can easily be changed from on voltage output to several other AC voltages all through wiring the generator head block differently for each custom application. If shore power single phase AC power energize the AC motors that power the mechanical rotation of the generator head occurs and the outcome will be like the inverter AC and the output will be pure sine wave AC waveform as well in 3 Phase as well.

Example 21

The power conditioning and power generation of Example in 1; is further recited to be accomplished through the use of an energy storage flywheel, on the generator driveshaft to create on demand angular torque to help turn the generator head, providing more stable voltages upon power loads of compressor motor startup for the hybrid electric refrigeration power system, upon startup of the transport refrigeration unit or when the power from the generator powers the auxiliary power unit on the truck cab with generated AC power.

Example 22

In Example 17, the drive motors are mechanically connected to the generator through the drive shaft, when using the drive pulley belt to connect the drive motors to the driveshaft as the generator driveshaft rotates an upon energizing the compressor motor disconnect, powered by generator head; the generator head shaft slows down thus creating lower AC hertz cycle frequency of the AC wave; this mechanical slippage is momentary but long enough to lower the cycle frequency of the AC power; the mechanical phenomena of belt slippage occurs when the generator head is put under load the belt is tight enough to turn the generator driveshaft to get it up to speed but not tense enough to keep the belt from slipping under load, upon dropping the generator shaft speed to what would be equivalent of 10 hz the startup current is reduced and the motor starting voltage that is required to run the 3 phase refrigerator compressor motor drops as well; upon 3 phase compressor motor turning at the appropriate rpm for the 10 hz AC frequency, there is a electric actuator connected to a pulley and lever the pulley makes contact with the drive belt connecting the generator shaft pulley with the motor drive pulley and creates tension on the belt thus increasing the contact with the pulleys and belt; then the drive shaft of the generator starts to get to a higher rpm, and as this happens the generator head hertz frequency increases from 10 hz to the desired hertz frequency between 50-60 hertz AC for normal operation of the inverter duty refrigeration compressor motor; it is further recited that the speed sensor, and generator voltage meter on the start run relay of the generator to know when the belt tensioner and actuator are tight enough, thus shutting off power to the actuator and keeping the proper belt tension; upon shut off the electric actuator for the belt tensioner, the actuator will hold its tension on the pulley lever until the generator head stops turning and upon non use the actuator resets the lever and pulley tensioner to where they were before the generator starts up thus partially tight enough to engage the drive pulley and generator pulley.

Example 23

The power pack of Example 1; is in electrical communication with the electric compressor motor on an electric refrigeration units with built in electric motor already the power pack supplies 3 phase power generated from the invention or connected through the power pack to shore power AC power to power the refrigeration unit either dockside or mobile while in motion away from grid tied electric power; or in the event of the hybrid kit of the invention, the hybrid kit consist of 3 phase electric motor, motor mounts, electric clutch and belts to interface with the compressor and an electric clutch to interface with the already installed internal combustion motor currently used to power the refrigeration compressor; the power pack in Example 2 is also in electrical communication with the compressor motor powering the refrigeration compressor;

Example 24

As in Example 23; it is further recited that the power coming from the power pack is controlled by interfacing with the thermostat controls of the refrigeration unit; thus allowing for the power to be turned on to energize the electric compressor motor so the refrigeration compressor cools the trailer.

Example 25

As in Example 24; if the power pack supplying power to the refrigeration unit cannot supply power but the thermostat control is still signaling that the refrigeration unit must run; the invention will send a signal to override electrical operation of the refrigeration equipment and revert back to powering the refrigeration with the internal combustion engine as the refrigerator compressor power source; and the control circuit in this Example will override the electric operation and revert back to fulltime internal combustion powered refrigeration until the error is corrected and the control reset.

Example 26

As in Example 23; the power pack will have a manual control switch that the operator of the equipment will set to either internal combustion motor powered refrigeration or electrically powered refrigeration.

Example 27

As in Example 1; there is electrical communication between the power pack and the auxiliary power unit on the cab truck vehicle system; this is done through either using the inverter AC power and diverted DC power to dual power the auxiliary power demands on the air conditioner, heater, motor heater, and the hotel needs such as did players, TV. Refrigerator in the cab. It is further recited that the AC power source can be generated from the generator head and that L1 and L2 and the neutral tap of the generator wiring board can be configured to export single phase AC voltages that is pure sine, rather than using the inverter powered modified sine AC, but that either AC power in multiple voltages can and will be; in the electrical communication of the AC power is either brought over through a power cord, and in conjunction with the power cord from the invention power pack to the truck cab there is a power disconnect, and plug in, also there is a transfer switch that will allow the AC to be powered from shore power and bypass the power pack, for the DC electrical communication there is a disconnect switch as well as DC cables from the power pack to the auxiliary power needs of the cab where the DC power bank and the battery bank of the vehicle system to supply needed DC power upon demand, and the switch allows the tow DC power sources to be decoupled when necessary.

Example 28

As in Example 16, it is further recited that the AC and or DC drive motors will have their windings cryogenically frozen and then brought back to operating temperatures to increase the efficiency of the DC or AC drive motors that turn the generator head; the cryogenic process increases motor output and efficiency.

Example 29

As in Example 1, it is further recited that the follower wheel assembly has a spring tensioner along with an electric actuator tensioner that keeps constant tension on the follower wheel assembly and the vehicles wheel assembly on the outer surface of vehicle wheel.

Example 30

As in Example 29, it is further recited that that there is inferred heat sensor that focuses on the outer tire surface of the vehicle wheel; this inferred sensor is mounted on the outside of the enclosure; and when the tire temperature reaches a dangerously high temperature the sensor sends a signal that controls the electric actuator tensioning the follower wheel assembly and causes the electric actuator to remove the follower wheel assembly; thus possibly preventing a blowout from energy harvesting off the vehicle wheel; upon proper temperature of the outer tire surface the sensor sends a signal to the controller of the electric actuator to the predetermined follower wheel tension and energy harvest can continue again if the vehicle system is traveling fast enough.

Example 31

As in Example 2, it is further recited that the enclosure of the power generation system could be the trailer itself, in this case there will be no slide feature of the enclosure, but functionally this is equivalent to an enclosure as described in Example 2.

Example 32

As in Example 2, and further recited the enclosure could be mounted on the frame of a single component frame vehicle.

Example 33

As in Example 2, it further recited that the enclosure could be mounted on top of the frame of a truck body and still work as the enclosure in Example 2. states; and the follower wheel assembly could make contact with outer surface of any vehicle system wheel not just a trailer wheel.

LIST OF REFERENCE NUMBERS USED 1 vehicle tire/wheel
2 follower shaft
3 follower wheel
4 trailer
5 refrigeration unit (TRU)
6 shroud cover to cover electric motor for non hybrid (TRU)
7 power plug for connecting auxiliary cab/truck power
8 plug receptacle and fuse-box for auxiliary cab/truck power
9 truck/tractor cab
10 enclosure box
11 air conditioning cooling unit
12 shore power plug in 110 VAC, 220 VAC, and 3 Ph 230 VAC
13 Tensioner Spring Follower Assembly
14 pulley on follower shaft
15 belt connecting follower shaft from generator
16 generator pulley
17 generator
18 DC Battery bank
19 Inverter 12 VDC-220 VAC Modified Sine Junk AC
20 220 VAC Modified Sine Junk AC Fuse & Disconnect
21 single phase 220 VAC Universal Motors
22 12VDC electromagnetic clutch with pulley attachment
23 STC or AIG generator head producing 3 Phase 230VAC, 208 VAC, 440VAC
24 Emergency No Power Relay 25 Generator Magnetizing Circuit
26 Diesel motor on (TRU)
27 the Added 15 HP 3 Phase Motor if not already diesel/electric hybrid
28 motor shaft on electric motor 27
29 drive belt connecting motor 27 with (TRU) compressor
30 diesel motor shaft
31 (TRU) Compressor Unit
32 the electric motor mounts for motor 27
33 the belt tensioner between 27 and 31
34 power cable
35 circuit breaker disconnect
36 rollers
37 sliding track
38 disengagement lever
39 electrical components
40 support bar
41 connection pin to roller
42 wheel hub
43 bracket
44 axle suspension
45 cables
46 slide axles
47 (DC) heating element unit
48 variable speed fans (DC)
49 cover
50 bracket
51 internal fans circulating air
52 sensor
53 outlet fans
54 outlet fan shroud
55 outer surface of vehicle tire/wheel
56 pivot bracket
57 picot pin
58 spring on tensioner bar
59 tensioner bar pivot
60 CV Joint of 2
61 2 bearing
62 bearing holder
63 generator to battery voltage relay
64 pillow block bearing holder
65 shaft speed sensor
66 switch from exciter wire on/off to generator
67 12VDC light bulb light to regulate generator voltage
68 tie in bus for generator exciter wires
69 generator exciter wires
70 power cable from 220 fuse/disconnect to single phase motor.
71 positive power cable from battery to inverter
72 negative power cable from battery to inverter
73 positive cable from generator to battery to recharge batteries
74 voltage meter low or high (DC) voltage
75 output (AC) from Inverter
76 plug wire from inverter to fuse-able disconnect
77 fuse-able disconnect 2 pole 220 modified sine (AC) power
78 input of mod sine 9 AC) from inverter
79 unused or duplicate 21
80 drive belt connecting more than one 21 motor
81 drive pulley communication more than one 21 motor
82 generator drive shaft
83 drive pulley connecting connecting 87 and 83
84 speed sensor on 82 drive shaft
85 drive shaft 82 bearing holder
86 connecting belt 87 and 83
87 clutch pulley
88 switch for clutch on/off
89 82 coupling
90 inner bearing holder on 82
91 flywheel drive shaft 82 coupling
92 flywheel
93 flywheel holding bolts
94 flywheel to generator shaft coupling
95 generator shaft
96 (STC) or (AIG) generator head
97 wiring bus on generator head
98 L1 from generator
99 L2 from generator
100 L3 from generator
101 L1 to fuseable disconnect
102 L2 to fuseable disconnect
103 L3 to fuseable disconnect
104 Ground
105 input cable from generator to disconnect
106 fuseable disconnect shutoff between generator and 11, 27, and 8
107 output cable from disconnect to 27
108 male plug to motor
109 female plug to motor
110 power cord to motor
111 Motor 27 electric clutch
112 N/A
113 power cord to electric clutch
114 shore power fuseable disconnect
115 positive wire from 118 to 18
116 L2 from shore power
117 L1 from shore power
118 Rectifier L1 110Vac to 12 vdc
119 Rectifier L2 110Vac to 12 vdc
120 charging switch
121 switch to 21
122 negative power cable from 118 to 18
123 negative power cable from 119 to 18
124 positive cable from 119 to 18
125 L2 from shore power
126 L1 from shore power
127 rectifier charging full switch
128 L1 from 140 to 27
129 L2 from 140 to 27
130 L3 from 140 to 27
131 L1 from 127 to 134
132 L2 from 127 to 135
133 L3 from 127 to 136
134 L1 110Vac or 220 VAC to 12 vdc rectifier
135 L2 110VAc or 220 Vac to 12 vdc rectifier
136 L3 110Vac or 220 VAC to 12 vdc rectifier
137 shutoff relay battery full
138 shutoff relay wire to 127
139 Disconnect fuse box 3 phase power
140 on/off switch 27, 7, and as needed 11
141 Pos cable 134 to 18
142 neg cable 134 to 18
143 Neutral Tap wire from 139 to 7, and 11
144 Ground wire to 7, 11, 27
145 pos cable 135 to 18
146 neg cable 135 to 18
147 pos cable 136 to 18
148 neg cable 136 to 18
149 square bearing holder
150 protective barrier
151 Infrared sensor
152 infrared wave
153 heat follower disconnect relay 154 electric actuator
155 shutoff relay to exciter 63 if wheel 3 disengages from 1
156 generator not working/low battery
157 too high output generator
158 inverters dc too low/not working
159 inverter on/off switch
160 rubber wheel
161 tensioner electric actuator
162 car starter motor
163 starter motor mount bracket
164 starter pivot bar
165 bottom pivot bracket
166 actuator switch back forth
167 power cable to actuator
168 starter motor control relay
169 power cable to starter relay to electric switch 170
170 electric on off switch to starter
171 power cable to actuator
172 power cable to starter
173 pivot pin
174 voltmeter ac
175 Voltage Monitoring Relay
176 Remagnetizing Relay
177 Negative Power Cable to L2 102
178 Positive Power Cable to L1 101
179 power cable from 180 to 175
180 shaft speed sensor
181 cable going between 180 and 161
182 on board reefer control on/off start stop by thermostat on reefer
183 customer set diesel/electric operation selector switch
184 electric operation controller relay
185 diesel operation controlled by 182 and 24
186 Electric start controller by type of power available
187 3 phase heat strips to add heat back into reefer in winter
188 Auxiliary Power Control Relay
189 Inverter Power Select Switch
190 Mobile Generator 96 Selector Switch
191 Single or 3 Phase Shore Power Selector
192 Inverter 19 Transfer Switch to 7 and 34 for AC Power to 9
193 L1 from inverter 19
194 L2 from inverter 19
195 Neutral wire From 19
196 ground wire from 19 case
197 neutral tap wire from 96 and 100 to 8
198 foam insulation
199 energy dampening foam
200 insulation material non conductive Various modifications, additions and combinations can be made to the exemplary embodiments and their various features discussed without departing from the scope of the present invention. For example, while the embodiments described above refer to particular features, the scope of this invention also includes embodiments having different combinations of features and embodiments that do not include all of the above described features.

I claim:

1. A kinetic energy harvesting system for use with a moving vehicle, the system comprising:
   a tire configured for rolling contact with a road;
   a follower wheel assembly that is configured to releasably engage with the tire in rolling contact with the tire to capture rotational motion of the tire;
   a direct current generator mechanically coupled to the follower wheel assembly such that the rotational motion of the tire is used to generate direct current power;
   a power storage device electrically coupled to the direct current generator to store direct current power generated by the direct current generator; and
   an inverter that is electrically coupled to the power storage device such that the inverter receives direct current from the power storage device and outputs alternating current.

2. The kinetic energy harvesting system of claim 1, further comprising:
   an alternating current motor that is electrically coupled to the inverter such that the alternating current motor receives alternating current from the inverter; and
   an alternating current generator that is mechanically coupled to the alternating current motor to drive the alternating current generator such that the alternating current generator generates alternating current that can be used for onboard power needs of the vehicle.

3. The kinetic energy harvesting system of claim 2, wherein the follower wheel assembly comprises:
   a shaft having a first end and a second end;
   a wheel adapted to engage with the vehicle tire, the wheel secured to the first end of the shaft;
   a drive pulley secured to the second end of the shaft; and
   a drive belt extending between the drive pulley and the direct current generator such that rotation of the wheel is transferred to the direct current generator so that the direct current generator generates direct current.

4. The kinetic energy harvesting system of claim 3, wherein the follower wheel assembly further comprises a spring tensioner and an electric actuator tensioner that in combination are configured to maintain a constant tension between the follower wheel and the vehicle tire.

5. The kinetic energy harvesting system of claim 3, wherein the follower wheel assembly is configured to permit the follower wheel to move relative to the vehicle tire if debris comes in between the follower wheel and the vehicle tire.

6. The kinetic energy harvesting system of claim 3, wherein the follower wheel assembly is mounted onto the vehicle such that the follower wheel rotates in a counterclockwise direction.

7. The kinetic energy harvesting system of claim 2, wherein the alternating current generator is configured to provide either 1 Phase or 3 Phase alternating current.

8. The kinetic energy harvesting system of claim 2, wherein the direct current generator and/or the alternating current generator includes windings that have been cryogenically frozen to improve their efficiency.

9. The kinetic energy harvesting system of claim 1, wherein the direct current generator is electrically isolated from the power storage device when a speed of the vehicle is too low to generate direct current power.

10. The kinetic energy harvesting system of claim 1, further comprising an enclosure that contains and protects the direct current generator, the power storage device, and the inverter from environmental concerns, wherein the enclosure is separate from a motor vehicle cab.

11. The kinetic energy harvesting system of claim 10, wherein the enclosure is insulated.

12. The kinetic energy harvesting system of claim 10, further comprising a heating system for heating an interior of the enclosure, the heating system powered by power from the power storage device.

13. The kinetic energy harvesting system of claim 10, further comprising a cooling system for cooling an interior of the enclosure, the cooling system powered by power from the power storage device.

14. The kinetic energy harvesting system of claim 10, further comprising a circulating fan disposed within the enclosure, the circulating fan powered by power from the power storage device.

15. The kinetic energy harvesting system of claim 10, wherein the enclosure is attached to the vehicle via a plurality of rollers that engage with a track system that is welded or bolted to the vehicle such that the enclosure is configured to slide relative to the vehicle in order to accommodate a movable wheel base on the vehicle.

16. The kinetic energy harvesting system of claim 1, wherein the power storage device is sized and configured to store sufficient power that can be used for powering a trailer refrigeration unit or meeting auxiliary power needs of a truck.

17. The kinetic energy harvesting system of claim 16, further comprising circuitry connected to the power storage device for charging the power storage device using shore power.

18. The kinetic energy harvesting system of claim 16, further comprising circuitry connected to the trailer refrigeration unit for selectively powering the trailer refrigeration unit by either the power storage device or by shore power.

19. The kinetic energy harvesting system of claim 1, wherein the power storage device comprises more than one direct current batteries or capacitors.

20. The kinetic energy harvesting system of claim 1, wherein the direct current generator comprises one or more rectified automotive alternators.

\* \* \* \* \*